(12) United States Patent
Shimodaira

(10) Patent No.: US 12,070,862 B2
(45) Date of Patent: Aug. 27, 2024

(54) ROBOT SYSTEM, CONTROL METHOD FOR ROBOT SYSTEM, AND ADJUSTMENT METHOD FOR FORCE CONTROL PARAMETERS IN ROBOT SYSTEM

(71) Applicant: Seiko Epson Corporation, Tokyo (JP)

(72) Inventor: Yasuhiro Shimodaira, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 142 days.

(21) Appl. No.: 17/456,214

(22) Filed: Nov. 23, 2021

(65) Prior Publication Data

US 2022/0161428 A1 May 26, 2022

(30) Foreign Application Priority Data

Nov. 26, 2020 (JP) ................................ 2020-195934

(51) Int. Cl.
  *B25J 9/16* (2006.01)
  *B25J 13/08* (2006.01)

(52) U.S. Cl.
  CPC ........... *B25J 9/1633* (2013.01); *B25J 9/1612* (2013.01); *B25J 9/1653* (2013.01); *B25J 13/082* (2013.01)

(58) Field of Classification Search
  CPC ...... B25J 9/1633; B25J 9/1612; B25J 9/1653; B25J 13/082; B25J 9/1687; B25J 13/085; B25J 9/1602; G05B 2219/39338; G05B 2219/40032
  See application file for complete search history.

(56) References Cited

U.S. PATENT DOCUMENTS

| | | | | |
|---|---|---|---|---|
| 11,173,614 B2 * | 11/2021 | Adachi | ................... | B25J 9/1666 |
| 2011/0093120 A1 * | 4/2011 | Ando | ................... | B25J 13/085 |
| | | | | 700/260 |
| 2015/0174760 A1 * | 6/2015 | Fukuda | ................... | B25J 9/1687 |
| | | | | 700/260 |

(Continued)

FOREIGN PATENT DOCUMENTS

| | | |
|---|---|---|
| JP | 2008-134903 A | 6/2008 |
| WO | 2014-037999 A1 | 3/2014 |

*Primary Examiner* — Adam R Mott
*Assistant Examiner* — Sagar Kc
(74) *Attorney, Agent, or Firm* — Harness, Dickey & Pierce, P.L.C.

(57) ABSTRACT

A robot system includes a robot, a force detector, and an end effector. When the robot is caused to execute a following operation, force control is performed based on a measurement value by the force detector. The following operation is an operation in which a first target object held by the end effector is inserted into a void included in a second target object or pulled out from the void while coming into contact with the second target. The adjustment method includes a measuring step for causing the robot to perform the following operation using candidate values of the force control parameters including a target force in a direction orthogonal to a direction of the insertion or the pull-out and obtaining a force measurement value, a parameter updating step for performing optimization processing using the force measurement value and obtaining new candidate values of the force control parameters, and a step of repeating the measuring step and the parameter updating step to determine force control parameters and outputting the force control parameters.

6 Claims, 14 Drawing Sheets

(56) References Cited

U.S. PATENT DOCUMENTS

| | | | |
|---|---|---|---|
| 2015/0217453 A1* | 8/2015 | Zhang | B25J 9/1687 |
| | | | 901/41 |
| 2018/0029234 A1* | 2/2018 | Ueda | B25J 9/1633 |
| 2018/0276590 A1* | 9/2018 | Kubo | G06Q 10/06316 |
| 2018/0339414 A1* | 11/2018 | Taguchi | B25J 9/1633 |
| 2019/0329415 A1* | 10/2019 | Takeuchi | B25J 9/1633 |
| 2021/0138655 A1* | 5/2021 | Mousavian | B25J 9/161 |
| 2021/0197378 A1* | 7/2021 | Schönherr | B25J 9/1666 |
| 2023/0032334 A1* | 2/2023 | Hane | B25J 9/161 |
| 2023/0278205 A1* | 9/2023 | Yamaoka | B25J 9/1653 |
| | | | 700/260 |

* cited by examiner

ROBOT SYSTEM, CONTROL METHOD FOR ROBOT SYSTEM, AND ADJUSTMENT METHOD FOR FORCE CONTROL PARAMETERS IN ROBOT SYSTEM

The present application is based on, and claims priority from JP Application Serial Number 2020-195934, filed Nov. 26, 2020, the disclosure of which is hereby incorporated by reference herein in its entirety.

BACKGROUND

1. Technical Field

The present disclosure relates to a robot system, a control method for the robot system, and an adjustment method for force control parameters in the robot system.

2. Related Art

There has been a robot control device that performs impedance control in insertion work for inserting a component into a hole. In the technique disclosed in WO2014/037999 (Patent Literature 1), viscosity parameters in impedance control are set according to a plurality of sections set along a depth direction of a hole. In adjustment processing for the viscosity parameters, one of the viscosity parameters corresponding to the sections is reduced, an inserting operation by a robot is executed, and reaction acting on a hand is measured by a force sensor provided in the robot. By repeating processing for executing such processing in order about the viscosity parameters corresponding to the sections, a set of the viscosity parameters having short times of the insertion work is set while a condition under which the reaction is equal to or smaller than a predetermined value is satisfied.

Patent Literature 1 does not refer to a target force in a direction perpendicular to an inserting direction of the component in the control. This is because Patent Literature 1 is based on the premise that the inserting direction of the component is the vertically downward direction. In such a case, the magnitude of the target force in the direction perpendicular to the inserting direction has been set to zero.

However, the inserting direction of the component is not always the vertically downward direction. When the inserting direction of the component is a direction other than the vertical direction, the inserted component comes into contact with the inner wall of the hole and receives a normal force and a frictional force from the inner wall of the hole. Therefore, depending on control in which the magnitude of the target force in the direction perpendicular to the inserting direction is set to zero, actually, the component cannot be appropriately inserted into the hole.

The force sensor has a characteristic of, when receiving an external force, detecting force in a direction in which the force is actually received and outputting a detection signal and, on the other hand, assuming that force in a degree of several percent of the actually received force is detected in a direction perpendicular to the direction in which the force is actually received and outputting a detection signal. Therefore, even when the inserting direction of the component is the vertical direction, force is detected in the direction perpendicular to the inserting direction because of such a characteristic of the force sensor and control for reducing the force to zero is performed. Therefore, the component sometimes cannot be appropriately inserted into the hole.

SUMMARY

According to an aspect of the present disclosure, there is provided an adjustment method for force control parameters used in force control of a robot system. The robot system includes a robot, a force detector provided in the robot and configured to measure an external force, and an end effector provided in the robot and configured to hold a first target object. The force control is performed based on a measurement value of the external force by the force detector when the robot is caused to execute a following operation. The following operation is an operation in which at least a part of the first target object held by the end effector is inserted into a void included in a second target object while coming into contact with the second target object or the part is pulled out from the void while coming into contact with the second target object. The adjustment method includes: a measuring step for causing the robot to perform the following operation using candidate values of the force control parameters including a target force in a direction orthogonal to a direction of the insertion or the pull-out and obtaining a force measurement value, which is a measurement value of the external force in the following operation; a parameter updating step for performing optimization processing about the force control parameters using the force measurement value and obtaining new candidate values of the force control parameters; and a parameter determining step for repeating the measuring step and the parameter updating step to thereby determine force control parameters used in the force control of the robot system and outputting the force control parameters.

DESCRIPTION OF EXEMPLARY EMBODIMENTS

A. Embodiment

A1. Configuration of a Robot System

Figure 1:
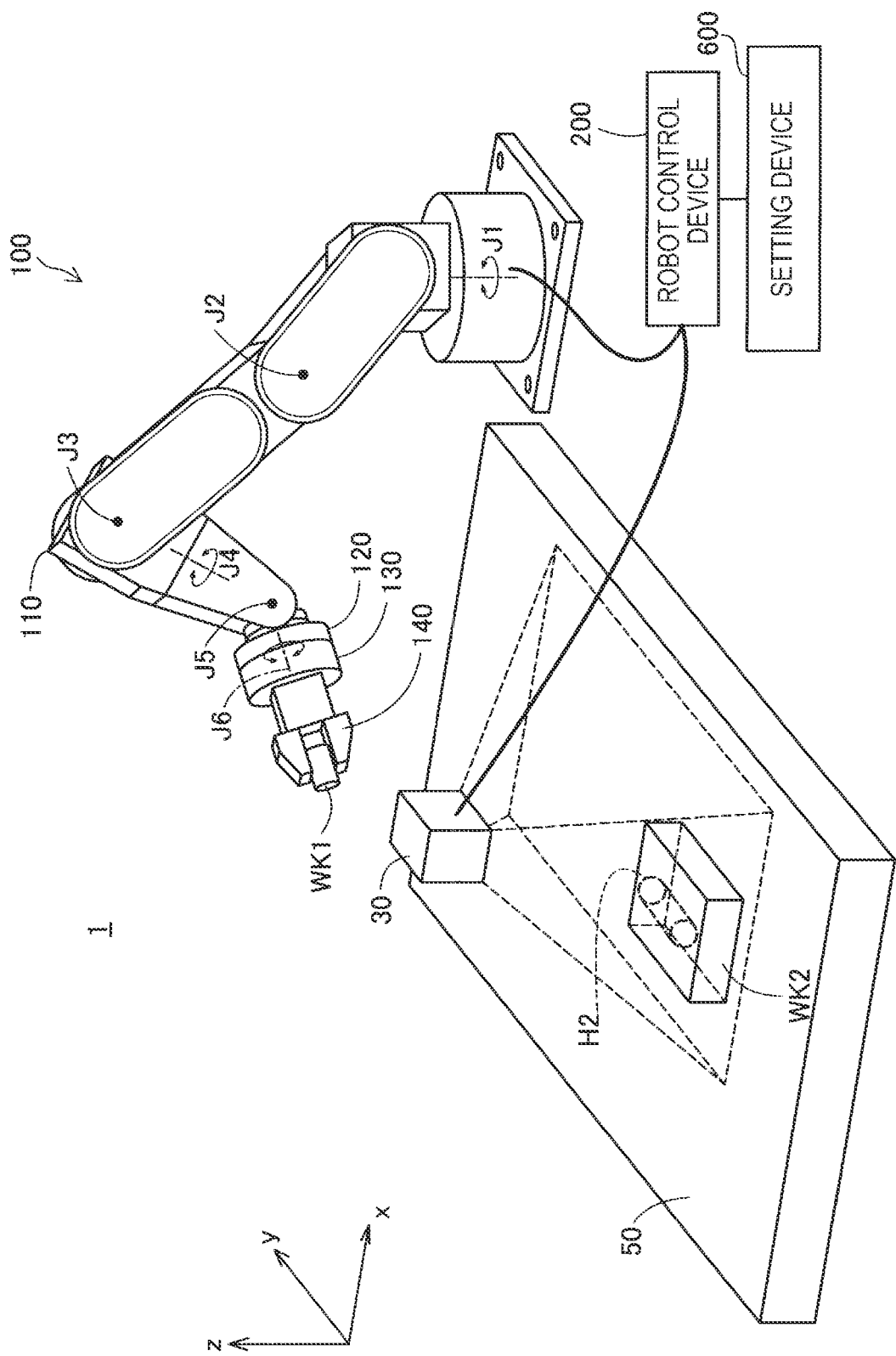
FIG. 1 is a perspective view showing a robot system in a first embodiment.

FIG. 1 is a perspective view showing a robot system 1 in an embodiment. The robot system 1 includes a camera 30, a robot 100, a force detector 130, an end effector 140, a robot control device 200, and a setting device 600. The robot 100, the robot control device 200, and the setting device 600 are communicably connected via a cable or radio.

The robot 100 is a single-arm robot used with various end effectors attached to an arm flange 120 present at the distal end of an arm 110. The arm 110 includes six joints J1 to J6. The joints J2, J3, and J5 are bending joints and the joints J1, J4, and J6 are torsion joints. Various end effectors for performing work such as gripping and machining on a target object are attached to the arm flange 120 present at the distal end of the joint J6. In this specification, a target object handled by the robot 100 is referred to as "workpiece" as well.

A position near the distal end of the arm 110 can be set as a tool center point. In the following explanation, the tool center point is referred to as "TCP". The TCP is a position used as a reference of a position of an end effector and can be set in any position. For example, a predetermined position on a rotation axis of the joint J6 can be set as the TCP. A six-axis robot is used in this embodiment. However, a robot including another joint structure may be used.

The robot 100 can arrange an end effector in any posture in any position within a movable range of the arm 110. The force detector 130 and the end effector 140 are set in the arm flange 120. The end effector 140 is a gripper in this embodiment. However, end effectors of any other types can be attached to the robot 100.

The force detector 130 is provided in the robot 100 and can measure an external force. More specifically, the force detector 130 is a six-axis sensor that measures forces of three axes acting on the end effector 140 and torques acting around the three axes. The force detector 130 detects magnitudes of forces parallel to three detection axes orthogonal to one another in a sensor coordinate system, which is a specific coordinate system, and magnitudes of torques around the three detection axes. A force sensor functioning as a force detector may be included in any one or more of the joints J1 to J5 other than the joint J6. The force detector only has to be able to detect force and torque in a direction in which force is controlled. For example, means for directly detecting force and torque like the force detector 130 and means for detecting torque of a joint of a robot and indirectly calculating force and torque may be used. The force detector 130 may detect force and torque only in the direction in which force is controlled.

A coordinate system defining a space in which the robot 100 is set is referred to as robot coordinate system. The robot coordinate system is a three-dimensional orthogonal coordinate system defined by an x axis and a y axis orthogonal to each other on the horizontal plane and a z axis having the vertical upward direction as a positive direction. A rotation angle around the x axis is represented by Rx, a rotation angle around the y axis is represented by Ry, and a rotation angle around the z axis is represented by Rz. Any position in a three-dimensional space can be represented by positions in the x, y, and z-axis directions. Any posture in the three-dimensional space can be represented by rotation angles in the Rx, Ry, Rz-axis directions. In this specification, "position" can also means a position and a posture. In this specification, "force" can also means force and torque.

A workpiece WK2, which is one of targets of work of the robot 100, is disposed on a workbench 50. A fitting hole H2 is formed on a side surface of the workpiece WK2. The fitting hole H2 is a hole having a circular cross section, extending in a y-axis positive direction from an opening on the side surface of the workpiece WK2, and having a bottom. The camera 30 is set above the workbench 50. The camera 30 is set such that the workpiece WK2 above the workbench 50 is included in a visual field. In the technique of the present disclosure, the camera 30 can be omitted.

The end effector 140 is provided in the robot 100 and can hold a workpiece WK1. The workpiece WK1 is a columnar component. The outer diameter of the workpiece WK1 is slightly smaller than the inner diameter of the fitting hole H2. The end effector 140 can perform work for fitting the workpiece WK1 gripped by the end effector 140 in the fitting hole H2 of the workpiece WK2.

The robot control device 200 controls the arm 110, the end effector 140, and the camera 30. More specifically, the robot control device 200 causes the robot 100 to execute a following operation. In general, the following operation is an operation for following an external force. More specifically, the following operation in this embodiment is an operation in which a part of the workpiece WK1 held by the end effector 140 is inserted into the fitting hole H2 included in the workpiece WK2 while coming into contact with the workpiece WK2. In the following operation, a time section when the workpiece WK1 separates from the workpiece WK2 may be present. In the following operation, the robot control device 200 performs force control of the robot 100 based on a measurement value of an external force by the force detector 130. Functions of the robot control device 200 are realized by a computer including a processor and a memory executing a computer program.

The setting device 600 receives an instruction from a teacher and generates a control program. The setting device 600 performs adjustment of force control parameters used in force control. The control program and the force control parameters generated by the setting device 600 are transferred to the robot control device 200 and stored in a memory 220 of the robot control device 200.

Figure 2:
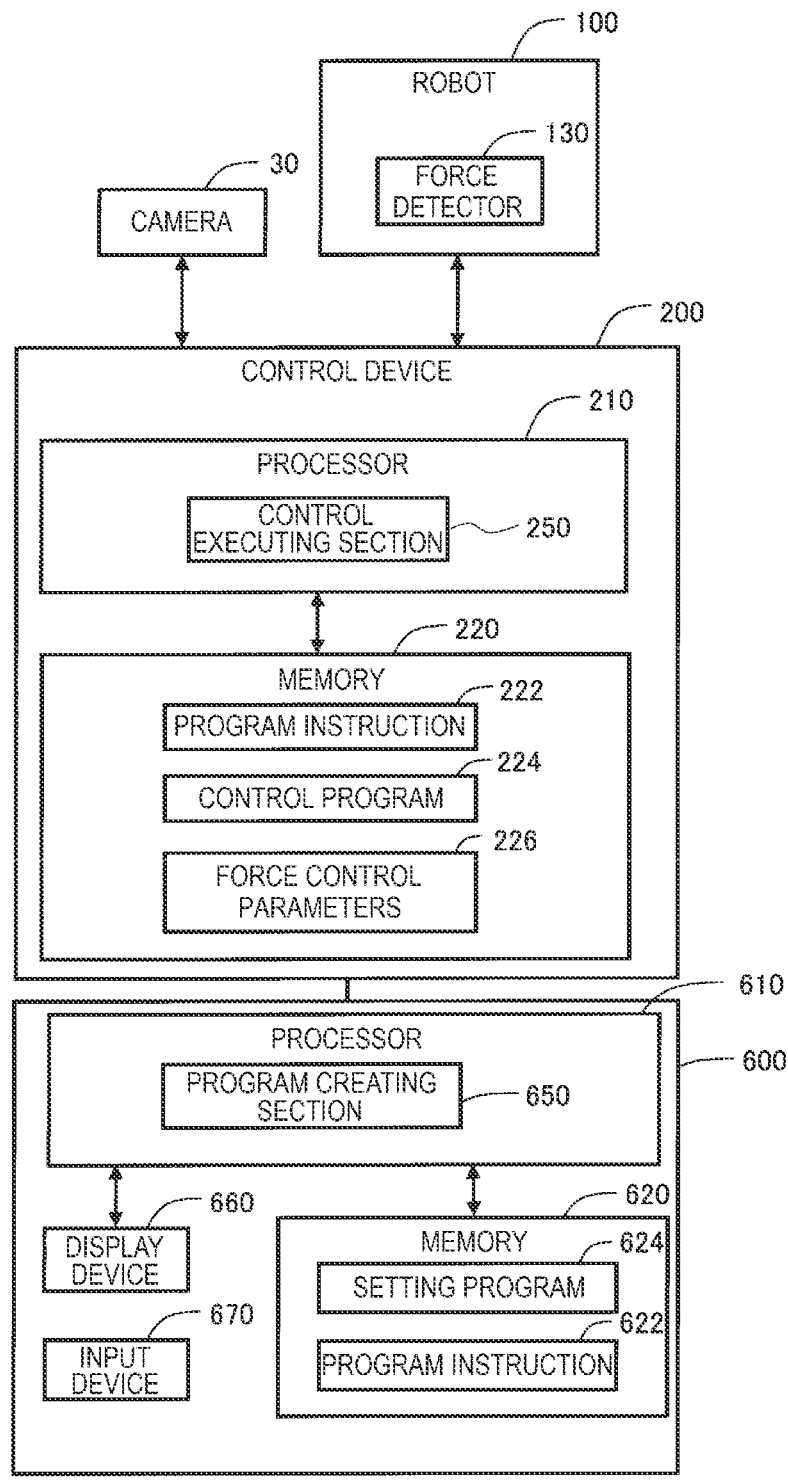
FIG. 2 is a block diagram showing functions of a robot control device and a setting device.

FIG. 2 is a block diagram showing functions of the robot control device 200 and the setting device 600. The robot control device 200 includes a processor 210 and the memory 220. The memory 220 includes a volatile memory and a nonvolatile memory. The processor 210 executes a program instruction 222 stored in advance in the memory 220 to thereby realize functions of a control executing section 250. The control executing section 250 executes a control program 224 stored in the memory 220 to thereby cause the robot 100 to execute an operation of work. A part or all of the functions of the control executing section 250 may be realized by a hardware circuit.

The setting device 600 includes a processor 610, a memory 620, a display device 660, and an input device 670. The memory 620 includes a volatile memory and a nonvolatile memory. The processor 610 executes a program instruction 622 stored in advance in the memory 620 to thereby realize functions of a program creating section 650. The program creating section 650 executes a setting program 624 stored in the memory 620 to thereby create the control program 224 according to an input from a user. Further, the program creating section 650 executes the setting program 624 to thereby determine parameters of the control program 224. A part or all of the functions of the program creating section 650 may be realized by a hardware circuit.

Figure 3:
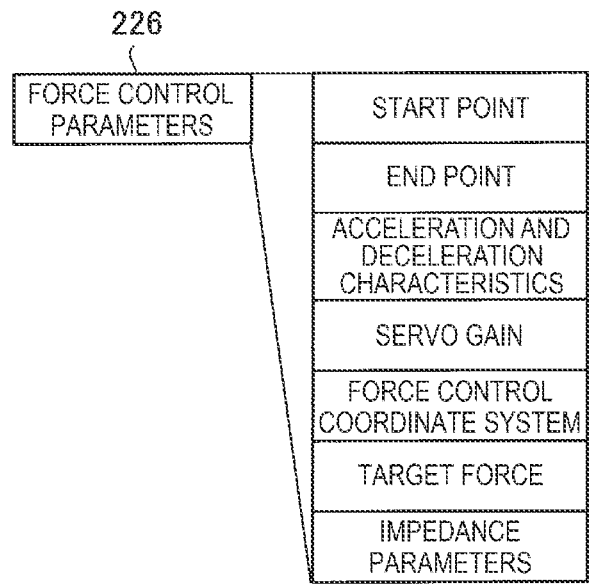
FIG. 3 is a diagram showing force control parameters used in a control program.

FIG. 3 is a diagram showing force control parameters 226 used in the control program 224. The force control parameters 226 are parameters concerning force control of the robot 100. The force control parameters 226 are referred to in force control performed according to the control program 224.

The force control parameters 226 include parameters indicating "start points" and "end points" in operations (see an upper part of FIG. 3). In this embodiment, a "start point" and an "end point" of the TCP of the control target robot 100 are defined in a robot coordinate system. Translation positions and rotation positions are defined about axes of the robot coordinate system. The start point and the end point may be defined in various coordinate systems.

In the force control, at least a part of the start points and the end points are not defined in one operation. For example, in a certain operation, when collision avoidance and following control are performed to reduce force acting in a certain direction to zero, in some case, a start point and an end point in the direction are not defined and a state in which a position can optionally change is defined to reduce the force in the direction to zero is defined.

The force control parameters 226 include "acceleration and deceleration characteristics" of the TCP in a plurality of operations (see a middle part of FIG. 3). According to acceleration and deceleration characteristics, when the TCP of the robot 100 moves from the start points to the end points of the operations, speeds of the TCP at times are specified. In this embodiment, speed described by the acceleration and deceleration characteristics is speed about the TCP of the control target robot 100. In this embodiment, speed of the TCP is defined in the robot coordinate system. That is, translational speeds and rotational speeds, that is, angular velocities are defined about the axes of the robot coordinate system. The acceleration and deceleration characteristics may be defined in various coordinate systems.

The force control parameters 226 include a servo gain in feedback control of the position of the TCP (see the middle part of FIG. 3). The servo gain includes a proportional gain, an integral gain, and a differential gain in PID control of the position of the TCP.

The force control parameters 226 include information indicating a "force control coordinate system" (see a lower part of FIG. 3). The force control coordinate system is a coordinate system for defining a target force of force control. Before optimization is performed, a starting point of a target force vector is the origin of the force control coordinate system. One axis of the force control coordinate system faces the direction of the target force vector. When various target forces in the force control are defined in teaching of a robot, acting points of target forces in operations of kinds of work are taught. For example, when a direction of a target object is changed in a state in which one point of the target object is brought into contact with another object and a constant target force is caused to act on the other object from the target object at a contact point of the target object and the other object, a force control coordinate system is defined again as follows. That is, a point where the target object is in contact with the other object is an acting point of the target force. A force control coordinate system, the origin of which is the working point, is defined.

The force control parameter 226 includes, as parameters, information for specifying a coordinate system, the origin of which is a point on which the target force of the force control acts and one axis of which faces the direction of the target force, that is, a force control coordinate system. The parameters can be variously defined. For example, the parameters for specifying the force control coordinate system can be defined by data indicating a relation between the force control coordinate system and other coordinate systems (a robot coordinate system and the like).

The force control parameters 226 include a "target force" (see the lower part of FIG. 3). The target force is force taught as force that should act on any point in various kinds of work and is defined by the force control coordinate system. A target force vector indicating the target force is defined as a starting point of the target force vector and six-axis components from the starting point, that is, translational forces of three axes and torques of the three axes and is represented in the force control coordinate system. If the relation between the force control coordinate system and the other coordinate systems is used, the target force can be converted into a vector in any coordinate system, for example, a robot coordinate system.

The force control parameters 226 include "impedance parameters" (see the lower part of FIG. 3). Impedance control is control for realizing virtual mechanical impedance with driving forces of motors that drive the joints. In the impedance control, mass, which the TCP virtually has, is defined as a virtual mass coefficient m. Viscous resistance, which the TCP virtually receives, is defined as a virtual viscosity coefficient d. A spring constant of an elastic force, which the TCP virtually receives, is defined as a virtual modulus of elasticity k. The impedance parameters are these coefficients m, d, and k. The impedance parameters are defined about translations and rotations with respect to the axes of the robot coordinate system.

In this embodiment, the target force and the impedance parameters can be set about each of a plurality of sections decided according to positions of control points in operations executed by robots. As a result, the parameters can be changed in time series.

A2. Creation of a Control Program and Adjustment of Parameters

Figure 4:
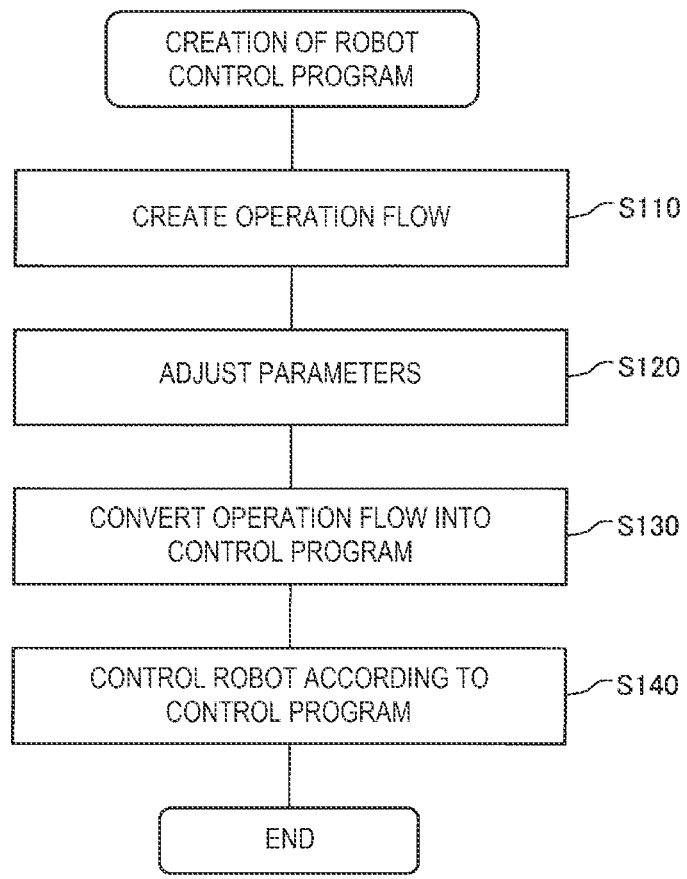
FIG. 4 is a flowchart showing a creation procedure for a control program.

FIG. 4 is a flowchart showing a creation procedure for a control program. In this embodiment, the control program created by processing shown in FIG. 4 is a program for realizing a following operation in which the workpiece WK1 held by the end effector 140 is inserted into the fitting hole H2 provided in the workpiece WK2. The processing shown in FIG. 4 is realized by the program creating section 650, which is a functional section of the processor 610 of the setting device 600.

In step S110, a flow of an operation realized by the control program 224 of the robot 100 is created. Specifically, operations to be executed by the robot 100 and order of the operations are determined according to an instruction of the teacher input via the display device 660 and the input device 670 of the setting device 600.

In step S120, adjustment of force control parameters used in force control of the robot system 1 is performed. The adjustment of the force control parameters is explained in detail below.

In step S130, the operation flow determined in step S110 and the force control parameters adjusted in step S120 are converted into a control program. The control program after the conversion is described in a low-level language.

In step S140, the control program is transferred from the setting device 600 to the robot control device 200 and stored in the memory 220 (see 224 in FIG. 2). According to the control program 224, the robot control device 200 controls the robot to execute work. The work can be executed as checking work for checking the operation of the robot 100 in a manufacturing line and main work for manufacturing products in the manufacturing line.

Figure 5:
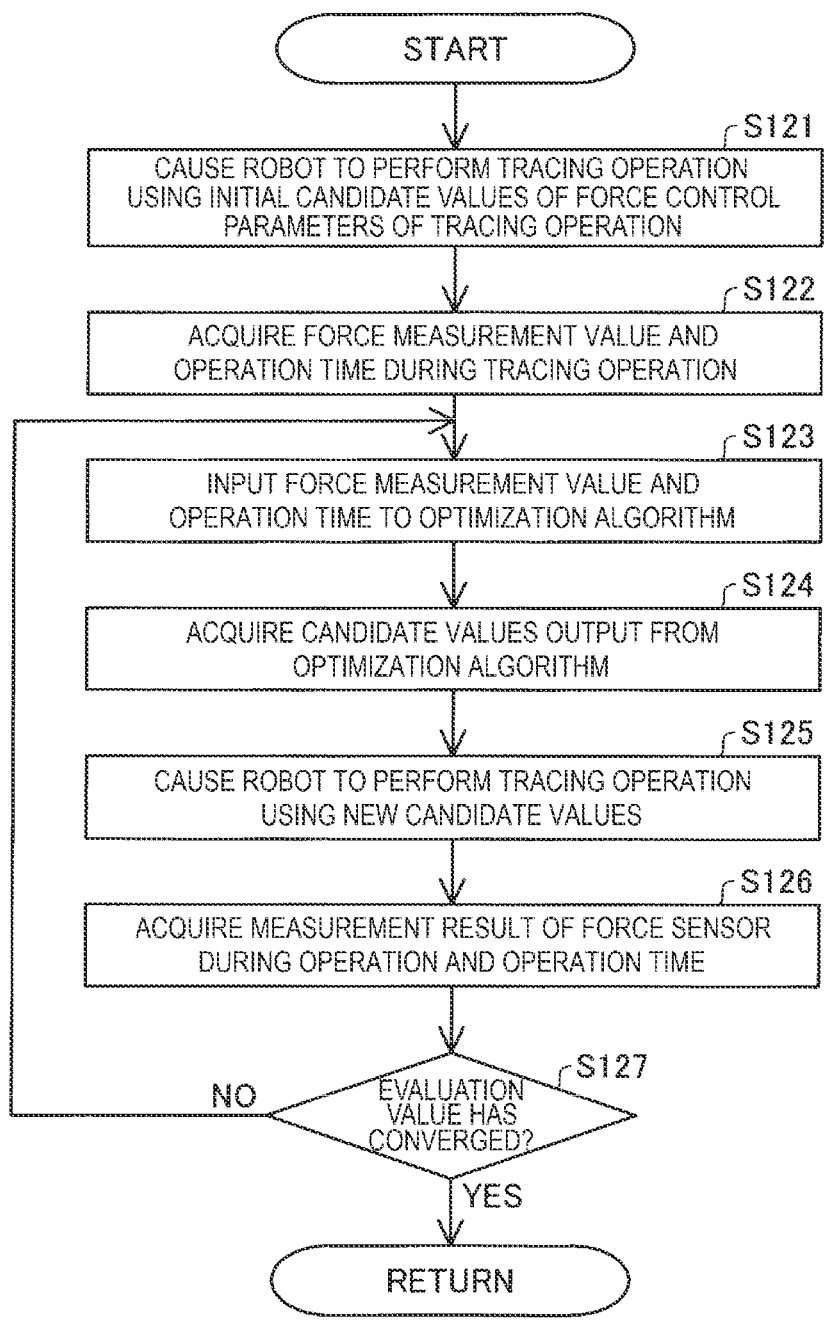
FIG. 5 is a flowchart showing an adjustment method for force control parameters in step S120 in FIG. 4.

FIG. 5 is a flowchart showing an adjustment method for the force control parameters in step S120 in FIG. 4. In the following explanation, in order to facilitate understanding of the technique, components of a target force Ft are described along the x axis, the y axis, and the z axis of the robot coordinate system.

In step S121, the robot control device 200 causes the robot 100 to perform the following operation using the operation flow of the following operation determined in step S110 and initial candidate values of the force control parameters of the following operation. The initial candidate values of the force control parameters of the following operation are not values decided according to a specific operation and are decided to be applicable to various following operations. The initial candidate values of the force control parameters of the following operation include, in addition to a target force in an direction of insertion or pull-out, a target force in a direction orthogonal to the direction of the insertion or the pull-out. The initial candidate values of the force control parameters of the following operation are stored in the memory 220 of the robot control device 200 in advance (see a middle right part of FIG. 2).

In step S122, a measurement value of external force in the following operation in step S121 is acquired. The measurement value of the external force is referred to as "force measurement value". In step S122, a time required for the following operation in step S121 is measured. The time required for the following operation is referred to as "operation time". The processing in step S122 is substantially performed in parallel to the processing in step S121. The processing in step S121 and the processing in step S122 are collectively referred to as "measurement processing" as well.

The following operation by the robot 100 in step S121 is executed seven times. In step S122, a maximum value of measurement values of the external force of the following operation performed seven times is adopted as the force measurement value. An average of times respectively required for the following operation performed seven times is adopted as the operation time. After the force measurement value, which is the maximum values of the measurement values, and the operation time, which is the average of the times, are obtained, the processing proceeds to step S123. The maximum value of the measurement values of the external force of the following operation is adopted as the force measurement value. However, not only this, but an average of the measurement values may be used.

In step S123, the force measurement value and the operation time are input to an optimization algorithm. The optimization algorithm performs optimization processing about the force control parameters using the force measurement value and the operation time and outputs new candidate values of the force control parameters (see FIG. 3). Processing by the optimization algorithm is explained below.

In step S124, the new candidate values of the force control parameters output from the optimization algorithm are acquired. The processing in step S123 and the processing in step S124 are collectively referred to as "parameter update processing" as well.

In step S125, the robot control device 200 causes the robot 100 to perform the following operation using the operation flow of the following operation determined in step S110 and the new candidate values of the force control parameters acquired in step S124.

In step S126, the force measurement value of the following operation in step S125 is acquired. In step S126, the operation time of the following operation in step S125 is measured. The processing in step S126 is substantially performed in parallel to the processing in step S125. The processing in step S126 is the same as the processing in step S122. The processing in step S125 and the processing in step S126 are collectively referred to as "measurement processing" as well.

The following operation by the robot 100 in step S125 is executed seven times. In step S126, a maximum value of measurement values of the external force of the following operation performed seven times is adopted as the force measurement value. An average of times respectively required for the following operation performed seven times is adopted as the operation time. After the force measurement time, which is the maximum value of the measurement values, and the operation time, which is the average of the times, are obtained, the processing proceeds to step S127.

In step S127, it is determined whether an evaluation value obtained in step S125 has converged. In this embodiment, the operation time is adopted as the evaluation value in step S127. Specific processing of the determination about whether the evaluation value has converged is explained below. When it is determined that the evaluation value has converged, the processing shown in FIG. 5 ends. When it is determined that the evaluation value has not converged, the processing returns to step S123.

The processing in steps S123 to S126 is repeated, whereby force control parameters used in the force control of the robot system 1 are determined. The determined force control parameters are output to the robot control device 200 from the setting device 600.

Figure 6:
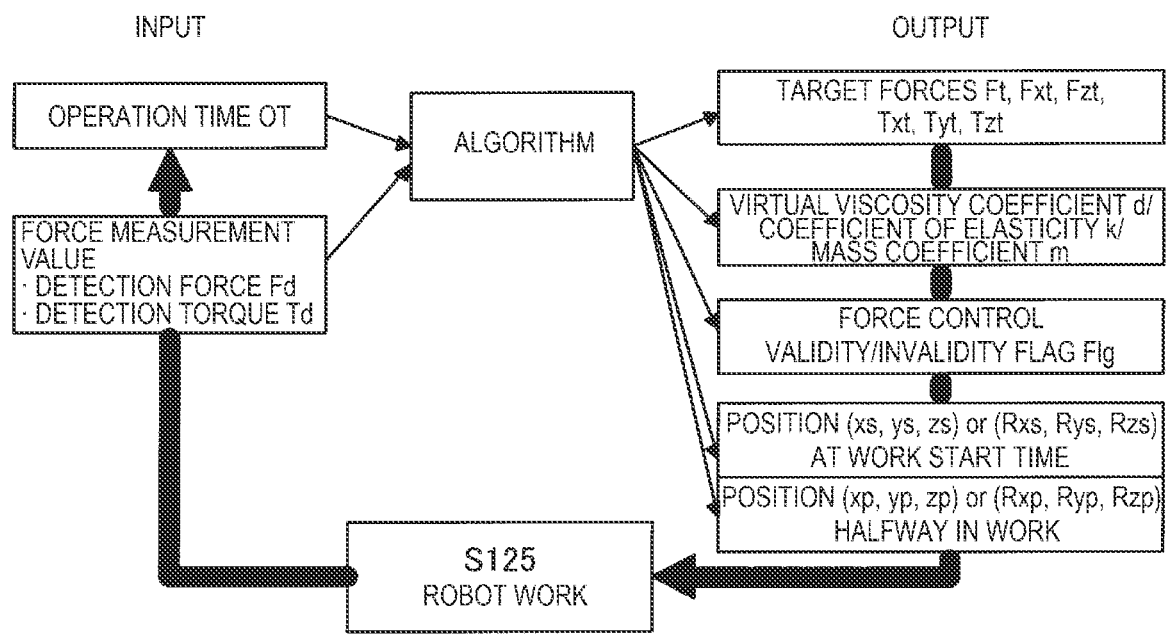
FIG. 6 is a block diagram showing inputs and outputs of an optimization algorithm used in parameter update processing in steps S123 and S124.

FIG. 6 is a block diagram showing inputs and outputs of the optimization algorithm used in the parameter update processing in steps S123 and S124. The optimization algorithm used in this embodiment is an algorism to which the force measurement value and the operation time are input and from which candidate values of the force control parameters are output. The optimization algorithm used in this embodiment is specifically CMA-ES (Covariance Matrix Adaptation Evolution Strategy).

An operation time OT and a detection force Fd and detection torque Td, which are force measurement values, are input to the optimization algorithm. The optimization algorithm outputs candidate values of the force control parameters (see a right part of FIG. 6).

By adopting such a configuration, in the parameter update processing in steps S123 and S124, new candidate values of the force control parameters can be obtained by the optimization processing considering the force measurement value and the operation time. Accordingly, by performing the force control with the force control parameters determined in the processing shown in FIG. 5, it is possible to cause the robot 100 to appropriately insert the workpiece WK1 into the fitting hole H2 in a movement with high evaluations about an external force received by the robot 100 in the following operation and the operation time OT of the following operation.

The optimization algorithm performs the optimization processing such that, for example, an evaluation value Eval decided by the following Expression (1) decreases. The second term and the third term of Expression (1) are so-called penalty terms.

$$\text{Eval} = \alpha \times OT$$

$$+ \beta \times [\text{if } (F\max > F\text{limit}), \text{ then } 100]$$

$$+ \gamma \times [\text{if } (T\max > T\text{limit}), \text{ then } 100] \quad (1)$$

OT: An operation time [second] of the following operation

Fmax: Magnitude of a maximum value of the detection force Fd detected during the following operation where the detection force Fd is a combined force of components of the x axis, the y axis, and the z axis Flimit: An allowable value of the magnitude of the maximum value of the detection force Fd Tmax: The magnitude of a maximum value of the detection torque Td detected during the following operation where the detection torque Td is combined torque of components about the x axis, the y axis, and the z axis Tlimit: An allowable value of the magnitude of the maximum value of the detection torque Td α, β, γ: Weight coefficients The candidate values of the force control parameters output by the optimization algorithm include the target force Ft in the following operation and impedance parameters (see an upper right part of FIG. 6 and the lower part of FIG. 3). The target force Ft is represented by a force component Fxt in the x-axis direction, a force component Fyt in the y-axis direction, a force component Fzt in the z-axis direction, a torque component Txt centering on the x axis, a torque component Tyt centering on the y axis, and a torque component Tzt centering on the z-axis. That is, the candidate values of the force control parameters of the following operation include, in addition to a target force in the direction of the insertion or the pull-out, a target force in a direction orthogonal to the direction of the insertion or the pull-out. The impedance parameters include the virtual mass coefficient m, the virtual viscosity coefficient d, and the vertical modulus of elasticity k.

In the force control parameters determined by such processing, the target force in the direction orthogonal to the direction of the insertion or the pull-out can be set to an appropriate value other than zero. Therefore, by performing the force control with such force control parameters, it is possible to perform not only the insertion or the pull-out along the vertical direction but also appropriate force control corresponding to a work environment and cause the robot 100 to appropriately insert the workpiece WK1 into the fitting hole H2. Even when the force detector outputs other axis components about a direction perpendicular to a direction in which force is actually received, it is possible to cause the robot 100 to appropriately insert the workpiece WK1 into the fitting hole H2. Further, by adjusting the force control parameters using an optimization method, it is possible to easily determine the force control parameters without repeating trial and error by the user.

The optimization algorithm outputs a flag Flg for designating validity or invalidity of the force control, a position (xs, ys, zs) or (Rxs, Rys, Rzs) of the end effector 140 at a start time of the following operation, and a position (xp, yp, zp) or (Rxp, Ryp, Rzp) of the end effector 140 at decided time between the start time and an end time of the following operation (see a lower right part of FIG. 6). In this embodiment, the position of the end effector 140 means a position based on a control point set at the distal end of the end effector 140.

The parameters xs, ys, and zs represent a position of the end effector 140 at the start time of the following operation as a position of one point in a three-dimensional space. The parameters Rxs, Rys, and Rzs represent a posture of the end effector 140 at the start time of the following operation.

The parameters xp, yp, and zp represent a position of the end effector 140 at the time between the start time and the end time of the following operation as a position of one point in a three-dimensional space. In other words, the parameters xp, yp, and zp represent a position of a passing point in the following operation as a position of one point in the three-dimensional space. The parameters Rxp, Ryp, and Rzp represent a posture of the end effector 140 at the time between the start time and the end time of the following operation. In other words, the parameters Rxp, Ryp, and Rzp represent a posture of the end effector 140 at a passing point in the following operation. The optimization algorithm outputs designated one of the parameters xp, yp, and zp and the parameters Rxp, Ryp, and Rzp concerning the passing point.

By performing the force control with the force control parameters determined by such processing, it is possible to perform control in which validity and invalidity of the force control, the position (xs, ys, zs) or (Rxs, Rys, Rzs) of the end effector 140 at the start time of the following operation, and the position (xp, yp, zp) or (Rxp, Ryp, Rzp) of the end effector 140 at the passing point of the following operation are appropriately designated and cause the robot 100 to appropriately insert the workpiece WK1 into the fitting hole H2.

For example, even if the force control is not performed, the workpiece WK1 sometimes can be appropriately inserted into the fitting hole H2 by bending of the hardware configuration of the robot 100. By including the flag Flg for designating validity or invalidity of the force control in targets of the optimization processing, it is possible to prevent the force control from being performed in such a case.

Figure 16:
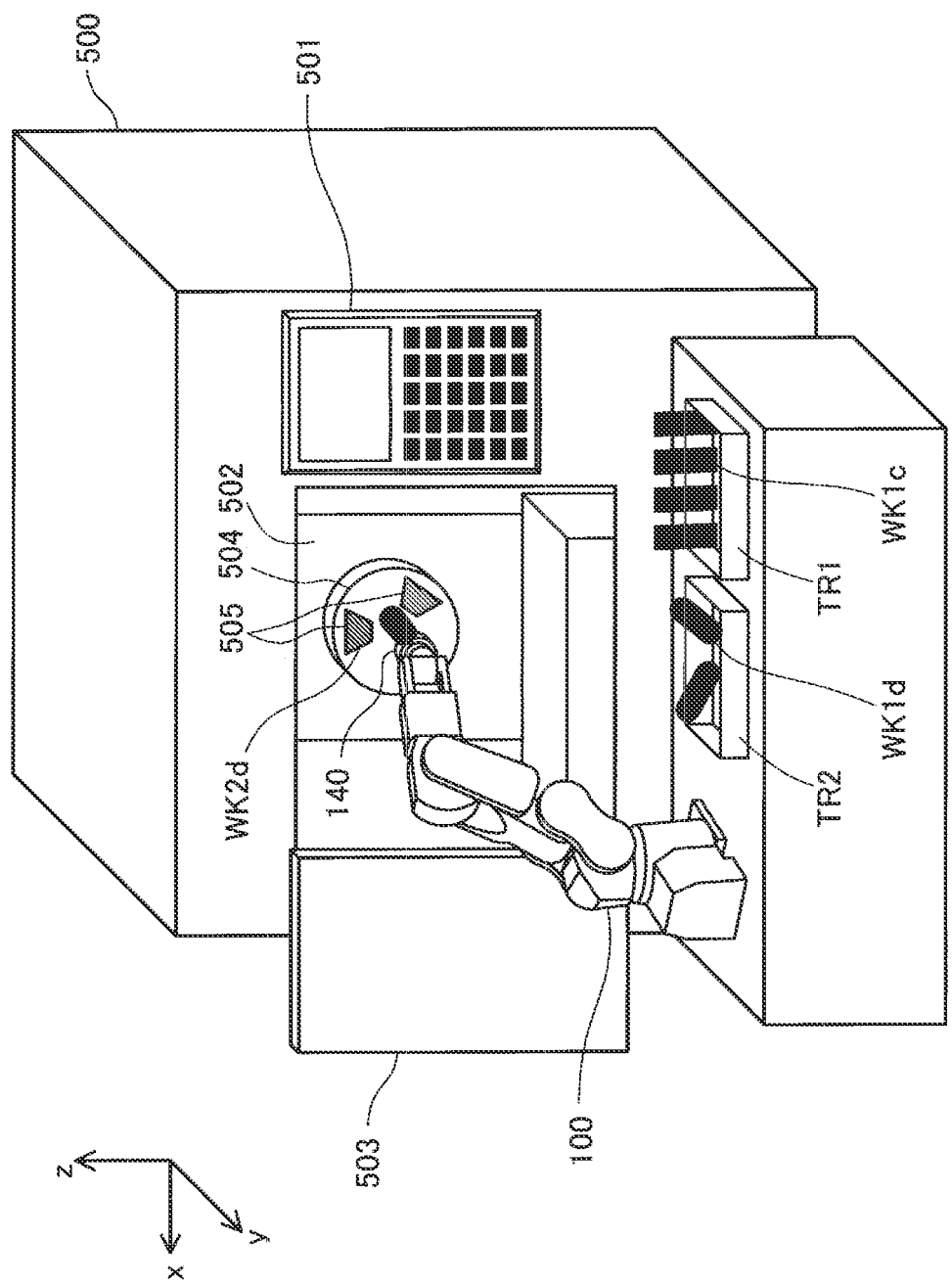
FIG. 16 is an explanatory diagram showing another application example 2 of the technique of the present disclosure.

The optimization algorithm outputs the acceleration and deceleration characteristics, the servo gain, and the force control coordinate system (see FIG. 3), which are the force control parameters, other than the parameters shown in FIG. 16.

Figure 7:
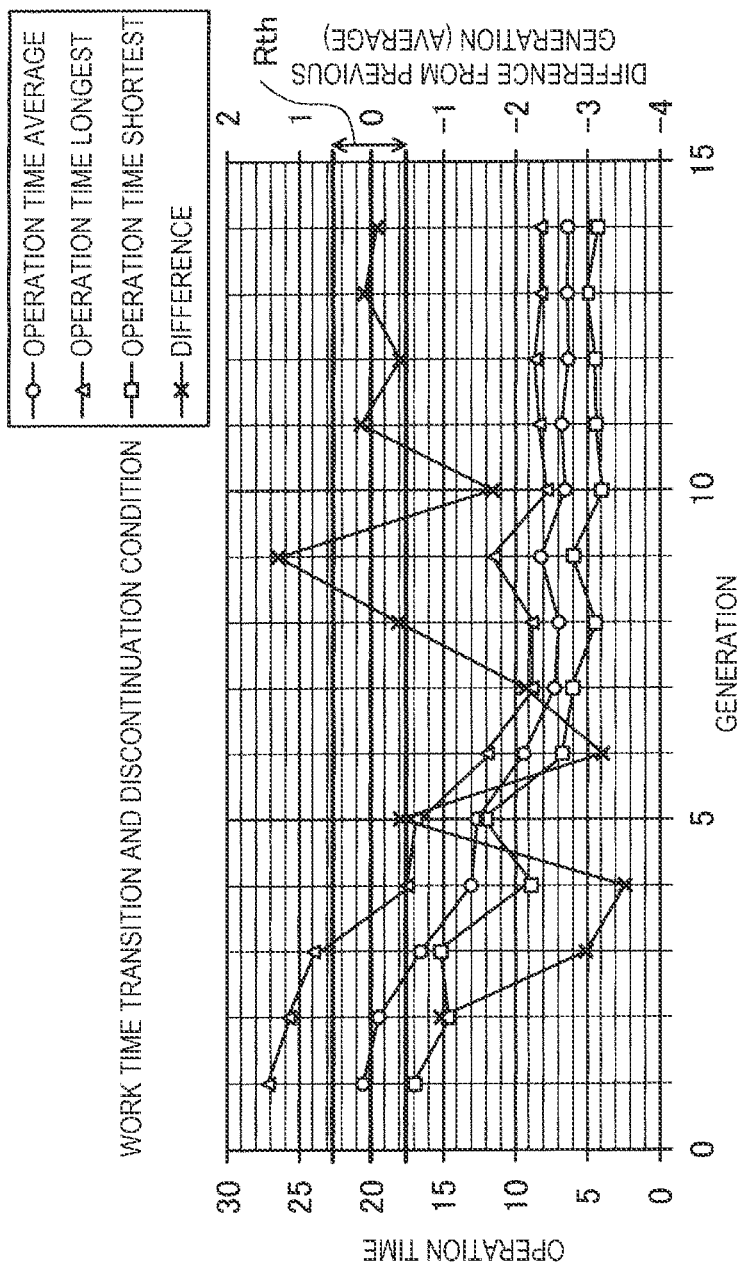
FIG. 7 is a graph showing transition of an operation time involved in repetition of processing in steps S123 to S126.

FIG. 7 is a graph showing transition of an operation time involved in repetition of the processing in steps S123 to S126. The horizontal axis indicates the number of times of the repetition of the processing in steps S123 to S126. The left vertical axis indicates the operation time OT. The right vertical axis indicates a difference between an operation time in each time of the repetition and an operation time in the last time of the repetition. Circles in the graph shown in FIG. 7 represent an average of operation times obtained in the seven times of measurement in step S125. Triangles represent a maximum value of the operation times obtained in the seven times of measurement. Squares represent a minimum value of the operation times obtained by the seven times of measurement. It is seen that all of the average, the maximum value, and the minimum value decrease as the processing is repeated.

X in the graph of FIG. 7 indicates a difference between an average of operation times in each measurement processing and an average of operation times in the immediately preceding measurement processing. It is see that the absolute value of the difference approach 0 as the processing is repeated.

In step S127 in FIG. 5, when the difference is continuously present within a predetermined range Rth centering on 0 four times in the repetition of the processing in steps S123 to S126, it is determined that the evaluation value has converged. By performing such processing, the processing in steps S123 to S126 is prevented from being repeated despite the fact that the operation time is not reduced.

In this embodiment, the adjustment of the force control parameters is performed by the processing shown in FIG. 5 without providing a restriction for setting a force component in the direction perpendicular to the inserting direction to zero is not provided about the target force Ft. Therefore, in principle, a value other than zero is set about the force component in the direction perpendicular to the inserting direction as well. As a result, in step S140 in FIG. 4, the force control is executed according to a target force including a component in the direction orthogonal to the direction of insertion, the component having non-zero magnitude. Accordingly, it is possible to cause the robot 100 to appropriately insert the workpiece WK1 into the fitting hole H2 with a control method for performing force control for applying force in the direction orthogonal to the direction of insertion as well.

A3. Example of the Following Operation

An example of the following operation is explained with reference to FIGS. 8 to 12. Work explained in FIGS. 8 to 12 is snapping work. The following operation explained below is realized by force control executed by the robot control device 200. FIGS. 8 to 12 do not accurately show the shapes of the workpieces WK1 and WK2, the end effector 140, and the force detector 130.

Figure 8:
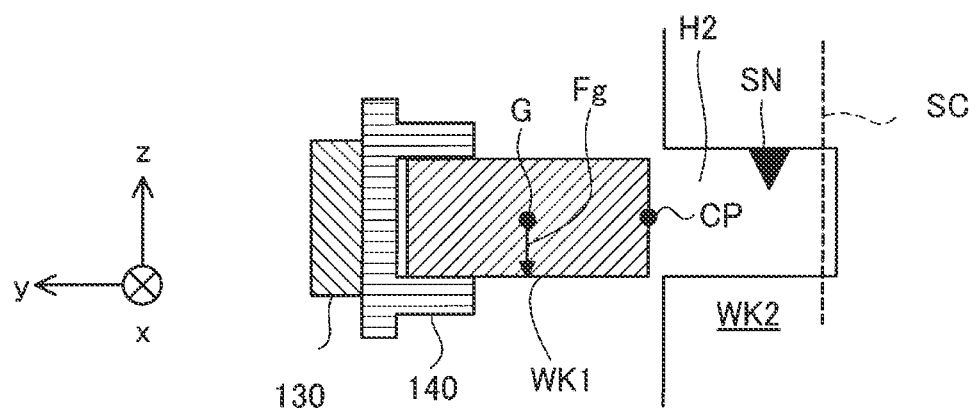
FIG. 8 is an explanatory diagram showing a state at a start time of a following operation in step S140.

FIG. 8 is an explanatory diagram showing a state at a start time of the following operation in step S140. In order to facilitate understanding of the technique, technical content is explained with reference to the robot coordinate system. The direction of the insertion in the following operation is a y-axis negative direction in the robot coordinate system (see H2 in FIG. 1).

A snapping mechanism SN is provided on a surface located in a z-axis positive direction in the inner surface of the fitting hole H2 of the workpiece WK2. A claw of the snapping mechanism SN is pressed in a z-axis negative direction by a spring and projected by a predetermined dimension from the inner surface of the fitting hole H2. When being pressed in the z-axis positive direction, the claw of the snapping mechanism SN moves in the z-axis positive direction from the inside of the fitting hole H2. The claw of the snapping mechanism SN can exit in the z-axis positive direction to a position where the claw does not project from the inner surface of the fitting hole H2.

A control point CP of the robot 100 is arranged in the center of a distal end face of the workpiece WK1 held in the end effector 140. A virtual threshold plane Sc is set near the end in the inserting direction of the fitting hole H2. The threshold plane Sc is a plane parallel to the z axis and the x axis. In the following operation, when the control point CP reaches the threshold plane Sc, it is determined that the following operation is completed.

In the state shown in FIG. 8, gravity Fg is acting on the workpiece WK1. The gravity acting on the workpiece WK1 is represented by a vector, a starting point of which is a center of gravity G of the workpiece WK1. In the state shown in FIG. 8, the robot 100 is performing the force control to maintain the position and the posture of the workpiece WK1 resisting the gravity Fg acting on the workpiece WK1. The position and the posture of the workpiece WK1 at this time are a position and a posture in which a region occupied by the workpiece WK1 when being projected in the y-axis direction, which is the inserting direction, is included in a region occupied by the fitting hole H2 of the workpiece WK2. In this state, the robot 100 is not receiving reaction in the y-axis direction from the workpiece WK2.

Figure 9:
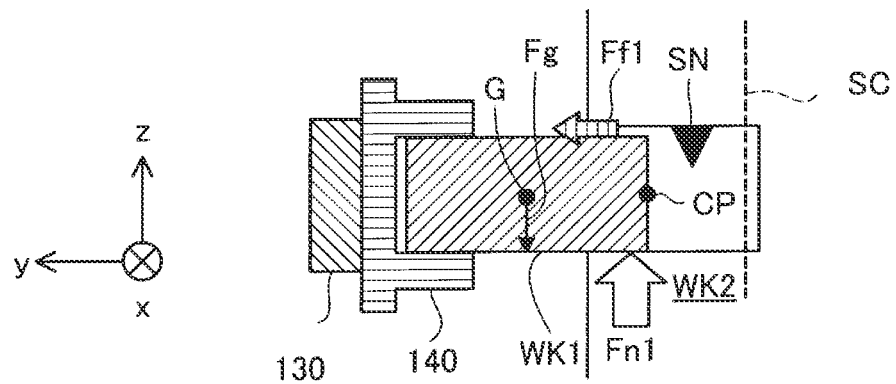
FIG. 9 is an explanatory diagram showing a state halfway in the following operation in step S140.

FIG. 9 is an explanatory diagram showing a state halfway in the following operation in step S140. In the state shown in FIG. 9, the distal end in the y-axis negative direction of the workpiece WK1 is located in the fitting hole H2 (see CP in FIG. 9). However, the distal end in the y-axis negative direction of the workpiece WK1 is not in contact with the snapping mechanism SN. At this time, the lower surface of the workpiece WK1 is in contact with the inner surface of the fitting hole H2.

In this state, the workpiece WK1 presses the inner surface of the fitting hole H2 in the z-axis negative direction and receives a normal force Fn1 in the z-axis positive direction from the inner surface of the fitting hole H2.

The workpiece WK1 moved in the y-axis negative direction by the following operation of the robot 100 receives a frictional force Ff1 in the y-axis positive direction from a contact surface with the inner surface of the fitting hole H2. In FIG. 9, forces in the y-axis direction that the workpiece WK1 receives from the workpiece WK2 are collectively shown as Ff1 in an upper part of the workpiece WK1. In the state shown in FIG. 9, a frictional force that the workpiece WK1 receives from the contact surface with the inner surface of the fitting hole H2 increases as the workpiece WK1 is further inserted into the fitting hole H2 and a contact region of the lower surface of the workpiece WK1 and the inner surface of the fitting hole H2 increases.

The robot control device 200 controls the robot 100 to generate a set target force in the y-axis direction and the z-axis direction. In other words, the robot control device 200 performs the force control such that the force Ff1 in the y-axis direction and the force Fn1 in the z-axis direction detected by the force detector 130 respectively coincide with a y-axis direction component and a z-axis direction component of the target force. As a result, the workpiece WK1 is moved upward in the fitting hole H2.

Figure 10:
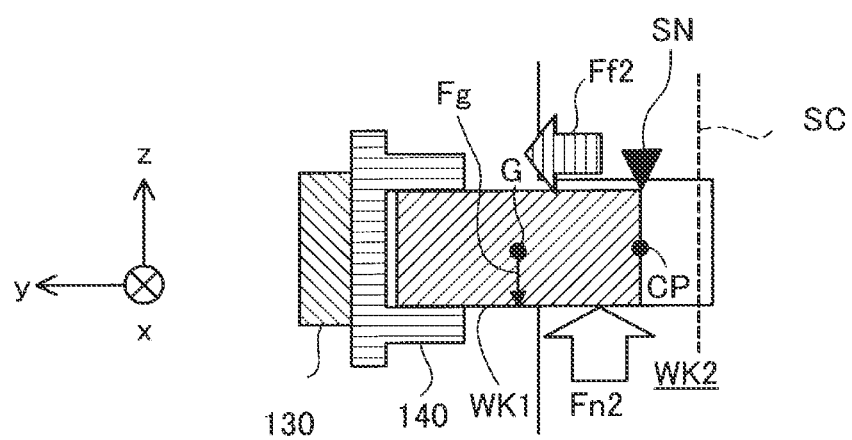
FIG. 10 is an explanatory diagram showing a state halfway in the following operation in step S140.

FIG. 10 is an explanatory diagram showing a state halfway in the following operation in step S140. In the state shown in FIG. 10, the distal end in the y-axis negative direction of the workpiece WK1 is in contact with the claw of the snapping mechanism SN. The lower surface of the workpiece WK1 is in contact with the inner surface of the fitting hole H2.

In this state, the workpiece WK1 presses the claw of the snapping mechanism SN in the y-axis negative direction and receives resistance in the y-axis positive direction from the claw of the snapping mechanism SN. The workpiece WK1 presses the inner surface of the fitting hole H2 in the z-axis negative direction and receives a normal force Fn2 in the z-axis positive direction from the inner surface of the fitting hole H2. Further, the workpiece WK1 moved in the y-axis negative direction by the following operation of the robot 100 receives a frictional force in the y-axis positive direction from the contact surface with the inner surface of the fitting hole H2. In FIG. 10, forces in the y-axis direction that the workpiece WK1 receives from the workpiece WK2 are collectively shown as Ff2 in the upper part of the workpiece WK1.

The robot control device 200 performs the force control such that the force Ff2 in the y-axis direction and the force Fn2 in the z-axis direction detected by the force detector 130 respectively coincide with a y-axis direction component and a z-axis direction component of a target force. As a result, the workpiece WK1 is pushed by larger force in the y-axis negative direction compared with the state shown in FIG. 9. On the other hand, moving speed in the y-axis negative direction of the workpiece WK1 decreases. When the force pushing the claw of the snapping mechanism SN in the y-axis negative direction increases to a fixed value or more, the claw of the snapping mechanism SN starts to exit in the z-axis positive direction. Resistance in the y-axis positive direction that the workpiece WK1 receives from the snapping mechanism SN increases as the exit in the z-axis positive direction of the snapping mechanism SN advances. In the state shown in FIG. 10 as well, a frictional force that the workpiece WK1 receives from the contact surface with the inner surface of the fitting hole H2 increases as the workpiece WK1 is further inserted into the fitting hole H2 and the contact region of the lower surface of the workpiece WK1 and the inner surface of the fitting hole H2 increases. Accordingly, the force Ff in the y-axis direction detected by the force detector 130 increases as the workpiece WK1 is further moved in the y-axis negative direction.

Figure 11:
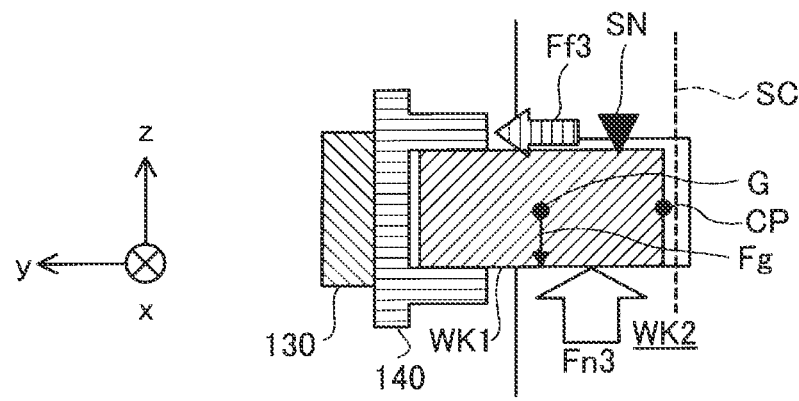
FIG. 11 is an explanatory diagram showing a state halfway in the following operation in step S140.

FIG. 11 is an explanatory diagram showing a state halfway in the following operation in step S140. In the state shown in FIG. 11, the distal end of the workpiece WK1 has passed through the snapping mechanism SN and the upper surface of the workpiece WK1 is in contact with the snapping mechanism SN.

In this state, the workpiece WK1 is pressed in the z-axis negative direction by the claw of the snapping mechanism SN. The workpiece WK1 presses the inner surface of the fitting hole H2 in the z-axis negative direction and receives a normal force Fn3 in the z-axis positive direction from the inner surface of the fitting hole H2. Further, the workpiece WK1 moved in the y-axis negative direction by the following operation of the robot 100 receives a frictional force in the y-axis positive direction from a contact section with the claw of the snapping mechanism SN and the contact surface with the inner surface of the fitting hole H2. In FIG. 11, forces in the y-axis direction that the workpiece WK1 receives from the workpiece WK2 including the claw of the snapping mechanism SN are collectively shown as Ff3 in the upper part of the workpiece WK1.

The robot control device 200 performs the force control such that the force Ff3 in the y-axis direction and the force Fn3 in the z-axis direction detected by the force detector 130 respectively coincide with the y-axis direction component and the z-axis direction component of the target force. As a result, the workpiece WK1 is pressed by smaller force in the y-axis negative direction compared with the state shown in FIG. 10. However, in the state shown in FIG. 11 as well, the frictional force that the workpiece WK1 receives from the contact surface with the inner surface of the fitting hole H2 increases as the workpiece WK1 is further inserted into the fitting hole H2 and the contact region of the lower surface of the workpiece WK1 and the inner surface of the fitting hole H2 increases. Accordingly, the force Ff in the y-axis direction detected by the force detector 130 increases as the workpiece WK1 is further moved in the y-axis negative direction.

Figure 12:
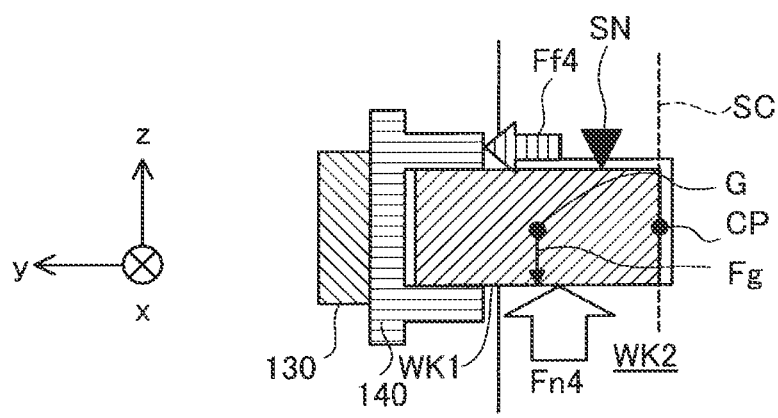
FIG. 12 is an explanatory diagram showing a state immediately before the following operation in step S140 is ended.

FIG. 12 is an explanatory diagram showing a state immediately before the following operation in step S140 is ended. In the state shown in FIG. 12, the distal end in the y-axis negative direction of the workpiece WK1 has reached the threshold plane Sc (see CP in FIG. 12). When detecting that the TCP reaches the threshold plane Sc, the robot control device 200 ends the following operation.

In FIG. 12, forces in the y-axis direction that the workpiece WK1 receives from the workpiece WK2 including the claw of the snapping mechanism SN are collectively shown as Ff4 in the upper part of the workpiece WK1. In FIG. 12, a normal force in the z-axis positive direction that the workpiece WK1 receives from the inner surface of the fitting hole H2 is shown as Fn4.

In the state immediately before the following operation is ended shown in FIG. 12, force that the workpiece WK1 receives from the inner surface of the workpiece WK2 and the claw of the snapping mechanism SN is substantially the same as the force in the state shown in FIG. 11. However, since the insertion of the workpiece WK1 into the workpiece WK2 further advances, the force Ff4 in the y-axis direction is larger than the force Ff3 shown in FIG. 11 and the force Fn4 in the z-axis direction is larger than the force Fn3 shown in FIG. 11.

When the following operation ends, the gripper functioning as the end effector 140 releases the workpiece WK1. The robot 100 shifts to the next operation.

Figure 13:
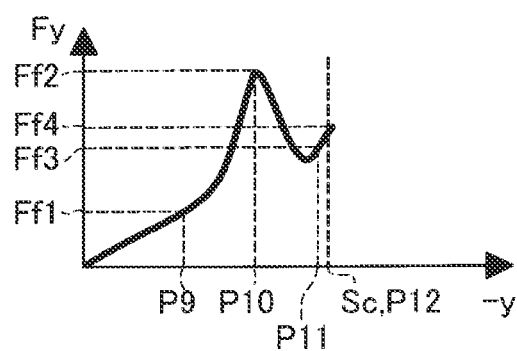
FIG. 13 is a graph showing force in a y-axis positive direction received by an end effector in the following operation.

FIG. 13 is a graph showing force Fy in the y-axis positive direction received by the end effector 140 in the following operation. The horizontal axis indicates a position of the control point CP along the y-axis negative direction. In the following operation shown in FIGS. 8 to 12, the force Fy in the y-axis positive direction received by the end effector 140 changes as shown in FIG. 13. The force Fy is the largest when the control point CP present on the distal end face of the workpiece WK1 is present in the position of the vertex of the claw of the snapping mechanism SN (see FIG. 10). In FIG. 13, positions of the control point CP in the states shown in FIGS. 9 to 12 are respectively indicated by P9 to P12. In FIG. 13, forces Ff1 to Ff4 in the y-axis positive direction in the states shown in FIGS. 9 to 12 are shown.

In the robot control device 200, target forces are set in time series to generate the force Fy shown in FIG. 13 in the following operation. In the processing in step S120 in FIG. 4, first, a plurality of sections dividing a range in which the following operation is performed are set in the y-axis direction, which is the inserting direction. In step S123 in FIG. 5, optimization processing for adjusting positions of boundaries among the plurality of sections in the y-axis direction and y-axis direction components of the target forces in the boundaries among the sections is performed. The target forces in the sections are determined by interpolating target forces in the boundaries at both ends of the sections. Force control for applying force in the y-axis negative direction is performed according to the y-axis direction components of the time-series target forces optimized in that way (see S120 in FIG. 4 and FIG. 13). As a result, the workpiece WK1 is inserted into the fitting hole H2 in a short time without receiving excessive force in the y-axis direction.

Figure 14:
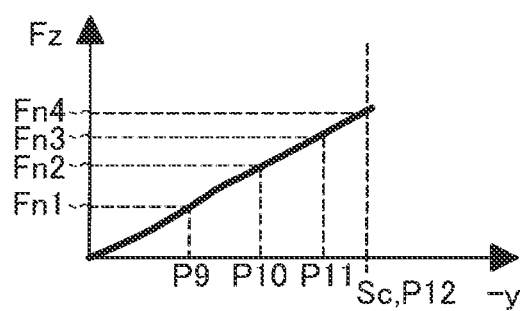
FIG. 14 is a graph showing force in a z-axis positive direction with which the end effector supports a workpiece in the following operation.

FIG. 14 is a graph showing force Fz in the z-axis positive direction received by the end effector 140 in the following operation. The horizontal axis indicates a position of the control point CP along the y-axis negative direction. In the following operation shown in FIGS. 8 to 12, the force Fz in the z-axis positive direction received by the end effector 140 changes as shown in FIG. 14. The force Fz increases as the workpiece WK1 is further inserted into the fitting hole H2. In FIG. 14, positions of the control point CP in the states shown in FIGS. 9 to 12 are respectively indicated by P9 to P12. In FIG. 14, forces Fn1 to Fn4 in the z-axis positive direction in the states shown in FIGS. 9 to 12 are shown.

In the robot control device 200, target forces are set in time series to generate the force Fz shown in FIG. 14 in the following operation. In step S123 in FIG. 5, optimization processing for adjusting positions of boundaries among a plurality of sections in the y-axis direction and z-axis direction components of the target forces in the boundaries among the sections is performed. The target forces in the sections are determined by interpolating target forces in the boundaries at both ends of the sections. Force control for applying force in the z-axis negative direction is performed according to the z-axis direction components of the time-series target forces optimized in that way (see S120 in FIG. 4 and FIG. 14). As a result, the workpiece WK1 is inserted into the fitting hole H2 in a short time without receiving excessive force in the z-axis direction.

As explained above, the parameters of the force control are set as the values that change in time series. Consequently, even in an operation in which there is a change in reaction or a frictional force halfway in the insertion or the pull-out, it is possible to set the force control parameters to apply appropriate force. Therefore, it is possible to prevent excessive force from being applied to a target object and reduce an operation time.

The robot control device 200 in this embodiment is referred to as "control section" as well. The setting device 600 is referred to as "adjusting section" as well. The workpiece WK1 is referred to as "first target object" as well. The workpiece WK2 is referred to as "second target object" as well. The fitting hole H2 is referred to as "void" as well. Steps S121, S122, S125, and S126 are referred to as "measuring step" as well. Steps S123 and S124 are referred to as "parameter updating step" as well. Steps S123 to S127 are referred to as "parameter determining step" as well. The processing performed in steps S123 to S127 is referred to as "parameter determination processing" as well.

B. Another Application Example 1

Figure 15:
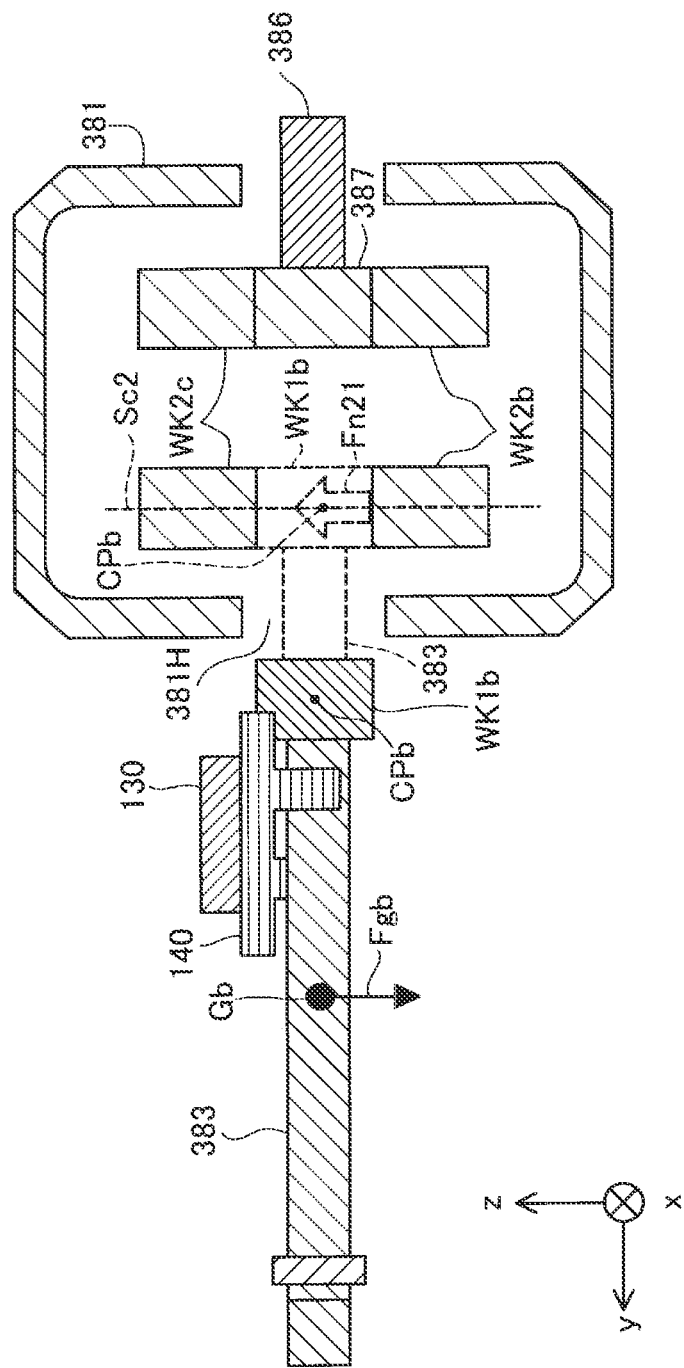
FIG. 15 is an explanatory diagram showing another application example 1 of a technique of the present disclosure.

FIG. 15 is an explanatory diagram showing another application example 1 of the technique of the present disclosure. An example is explained in which the technique of the present disclosure is applied to assembly of an actuating device, a so-called differential gear, of an automobile. In FIG. 15, in order to facilitate understanding of the technique, components other than a target object handled by the robot 100, the end effector 140, and the force detector 130 are omitted. FIG. 15 does not accurately show the shapes of the target object handled by the robot 100, the end effector 140, and the force detector 130.

In the actuating device halfway in assembly shown in FIG. 15, a left side gear WK1b is attached to the distal end of a left drive shaft 383 (see a center part of FIG. 15). A right side gear 387 is attached to the distal end of a right drive shaft 386. A pair of differential pinion gears WK2b and WK2c facing each other is assembled in a differential gear case 381 (see a right part of FIG. 15). In order to facilitate understanding of the technique, in FIG. 15, only portions where teeth are provided in the differential pinion gears WK2b and WK2c are shown. Illustration of the other portions is omitted.

The weight of the differential gear case 381 is generally large. Therefore, the right drive shaft 386 is assembled to, from the right, the differential gear case 381 fixed in a predetermined posture. The left drive shaft 383 is assembled to the differential gear case 381 from the left. In FIG. 15, the right drive shaft 386 is already assembled to the differential gear case 381. In this state, the right side gear 387 meshes with the pair of differential pinion gears WK2b and WK2c facing each other.

In this application example, the left drive shaft 383 is assembled to the differential gear case 381 through a hole 381H of the differential gear case 381. The following operation in this application example is an operation in which, in assembly of the actuating device of the automobile, the left side gear WK1b held by the end effector 140 is inserted into a void between the differential pinion gears WK2b and WK2c while coming into contact with the differential pinion gears WK2b and WK2c.

The robot 100 holds the left drive shaft 383 with the end effector 140. The end effector 140 receives gravity Fgb applied to the left drive shaft 383 and the left side gear WK1b. A center of gravity Gb of the left drive shaft 383 and the left side gear WK1b is shown in FIG. 15.

The force detector 130 detects vertically downward force Fg applied to the end effector 140 and torque due to the force Fg. In the force control, the robot control device 200 generates, in the joints of the arm 110, force and torque for offsetting the force and the torque and holds the positions and the postures of the left drive shaft 383 and the left side gear WK1b. A control point CPb of the robot 100 is decided in a position on a center axis of the left drive shaft 383 and the left side gear WK1b and in the left side gear WK1b (see the center part of FIG. 15).

In the state shown in FIG. 15, the left side gear WK1b is not in contact with the differential pinion gears WK2b and WK2c. Therefore, the left side gear WK1b is not receiving force from the differential pinion gears WK2b and WK2c.

The following operation is started from the state shown in FIG. 15. The left drive shaft 383 and the left side gear WK1b are moved in the y-axis negative direction. Thereafter, the left side gear WK1b comes into contact with the differential pinion gears WK2b and WK2c. Then, as in the case of the embodiment, the left side gear WK1b receives normal forces and frictional forces from the differential pinion gears WK2b and WK2c (see Ff1 and Fn1 in FIG. 9). In FIG. 15, the normal force that the left side gear WK1b receives from the differential pinion gear WK2b is indicated by a broken line as force Fn21.

As in the case of the embodiment, the normal forces and the frictional forces that the left side gear WK1b receives from the differential pinion gears WK2b and WK2c change as the insertion advances. On the other hand, the shapes, the positions, and the postures of the differential pinion gears WK2b and WK2c deviate from ideal shapes, positions, and postures because of a manufacturing error of the differential pinion gears WK2b and WK2c and a difference in assembly of the differential pinion gears WK2b and WK2c to the differential gear case 381. The normal forces and the frictional forces that the left side gear WK1b receives from the differential pinion gears WK2b and WK2c also deviate from assumed values in design because of the manufacturing error of the differential pinion gears WK2b and WK2c and the difference in assembly of the differential pinion gears WK2*b* and WK2*c* to the differential gear case 381.

The robot control device 200 performs the force control such that force in the y-axis direction and force in the z-axis direction detected by the force detector 130 respectively coincide with a y-axis direction component and a z-axis direction component of a target force and inserts the left drive shaft 383 into the differential gear case 381. When the control point CPb reaches a predetermined threshold plane Sc2, the work of the insertion ends. The threshold plane Sc2 is a plane parallel to the z axis and the x axis.

The technique of the present disclosure can be applied to such a following operation (see FIGS. 4 and 5). By applying the technique of the present disclosure, values of target forces in the x-axis direction and the z-axis direction orthogonal to the direction of the insertion are appropriately set. As a result, by performing the force control with the set force control parameters, it is possible to cause the robot system 1 to appropriately insert the left side gear WK1*b* into the void between the differential pinion gears WK2*b* and WK2*c*.

The left side gear WK1*b* in this embodiment is referred to as "first target object" as well. The differential pinion gears WK2*b* and WK2*c* are referred to as "second target object" as well.

C. Another Application Example 2

FIG. 16 is an explanatory diagram showing another application example 2 of the technique of the present disclosure. An example is explained in which the technique of the present disclosure is applied to machine tending for an NC (Numerically Controlled) machine tool, that is, supply of a machining target object to the NC machine tool and take-out of the machining target object from the NC machine tool. In FIG. 16, in order to facilitate understanding of the technique, components other than workpieces WK1*c* and WK1*d* handled by the robot 100, an NC machine tool 500 that processes a target object, the robot 100, and the end effector 140 are omitted. FIG. 16 does not accurately show the shapes of the workpieces WK1*c* and WK1*d*, the NC machine tool 500 that processes a target object, the robot 100, and the end effector 140.

The NC machine tool 500 includes an NC control panel 501, a machining space 502, an opening/closing door 503, a headstock 504, a chuck 505, a tool rest, and a cutting tool. In FIG. 16, in order to facilitate understanding of the technique, the tool rest and the cutting tool are omitted.

The NC control panel 501 is an input device for operating the NC machine tool 500. The machining space 502 is a space in which the workpiece WK1*c* is machined by the cutting tool. The headstock 504, the chuck 505, the tool rest, and the cutting tool are arranged in the machining space 502. The opening/closing door 503 is a door for separating the machining space 502 from an external space.

The chuck 505 is provided in the headstock 504. The chuck 505 includes three claws WK2*d* arranged at equal intervals centering on a center axis of rotation of the headstock 504. The chuck 505 presses the workpiece WK1*c* from three directions with the three claws WK2*d* and fixes the workpiece WK1*c* to the headstock 504. The headstock 504 rotates centering on the center axis together with the shuck 505 and the workpiece WK1*c* held by the chuck 505.

The cutting tool is supported by the tool rest. The tool rest is brought close to the rotating workpiece WK1*c* and arranged in a predetermined position, whereby the cutting toll is pressed against the rotating workpiece WK1*c* and the workpiece WK1*c* is cut. A position of the tool rest and rotating speed of the headstock 504, which change as time elapses, are decided in advance by an input via the NC control panel 501.

One following operation in this application example is an operation in which a part of the workpiece WK1*c* held by the end effector 140 is inserted into a void surrounded by the three claws WK2*d* of the chuck 505 while coming into contact with one or more of the three claws WK2*d* of the chuck 505 of the NC machine tool 500. Another following operation in this application example is an operation in which a part of the workpiece WK1*d* after machining held to be removable by the three claws WK2*d* of the chuck 505 is pulled out from the void surrounded by the three claws WK2*d* of the chuck 505 while coming into contact with one or more of the three claws WK2*d* of the chuck 505.

Before machining to the workpiece WK1*c*, the opening/closing door 503 is opened and the machining space 502 is opened. At this time, the three claws WK2*d* of the chuck 505 are arranged at an interval having size that can receive the workpiece WK1*c* before the machining. The workpiece WK1*c* before the machining is placed in a tray TR1. The robot 100 holds the workpiece WK1*c* before the machining with the end effector 140 and inserts a part of the workpiece WK1*c* into the void surrounded by the three claws WK2*d* of the chuck 505. Thereafter, the three claws WK2*d* approaches the workpieces WK1*c*, presses the workpiece WK1*c* from three directions, and fixes the workpiece WK1*c* to the headstock 504.

The robot control device 200 performs the force control such that force in the y-axis direction, force in the z-axis direction, and force in the x-axis direction detected by the force detector 130 respectively coincide with a y-axis direction component, a z-axis direction component, and an x-axis direction component of a target force and inserts the workpiece WK1*c* before the machining into the void surrounded by the three claws WK2*d* of the chuck 505. When a control point reaches a predetermined threshold plane, the work of the insertion ends. The threshold plane is a plane parallel to the z axis and the x axis.

The technique of the present disclosure can be applied to such a following operation (see FIGS. 4 and 5). By applying the technique of the present disclosure, values of target forces in the x-axis direction and the z-axis direction orthogonal to the direction of the insertion are appropriately set. As a result, by performing the force control with the set force control parameters, it is possible to cause the robot system 1 to appropriately insert the workpiece WK1*c* before the machining into the void surrounded by the three claws WK2*d* of the chuck 505.

After the machining to the workpiece WK1*c*, the opening/closing door 503 is opened and the machining space 502 is opened. Thereafter, the three claws WK2*d* of the chuck 505 are arranged at an interval having size for enabling the robot 100 to pull out the workpiece WK1*d* after the machining. The workpiece WK1*d* after the machining is still held by the three claws WK2*d* of the chuck 505. The robot 100 holds the workpiece WK1*d* after the machining with the end effector 140 and pulls out the workpiece WK1*d* after the machining from the void surrounded by the three claws WK2*d* of the chuck 505. Thereafter, the robot 100 places the workpiece WK1*d* on a tray TR2.

The robot control device 200 performs the force control such that force in the y-axis direction, force in the z-axis direction, and force in the x-axis direction detected by the force detector 130 respectively coincide with a y-axis direction component, a z-axis direction component, and an x-axis direction component of a target force and pulls out the workpiece WK1d after the machining from the void surrounded by the three claws WK2d of the chuck 505.

The technique of the present disclosure can be applied to such a following operation (see FIGS. 4 and 5). By applying the technique of the present disclosure, values of target forces in the x-axis direction and the z-axis direction orthogonal to the direction of removal are appropriately set. As a result, by performing the force control with the determined force control parameters, it is possible to cause the robot system 1 to appropriately remove the workpiece WK1d after the machining from the void surrounded by the three claws WK2d of the chuck 505.

The workpieces WK1c and WK1d in this embodiment are referred to as "first target object" as well. The three claws WK2d of the chuck 505 of the NC machine tool 500 are referred to as "second target object" as well.

D. Another Application Example 3

Figure 17:
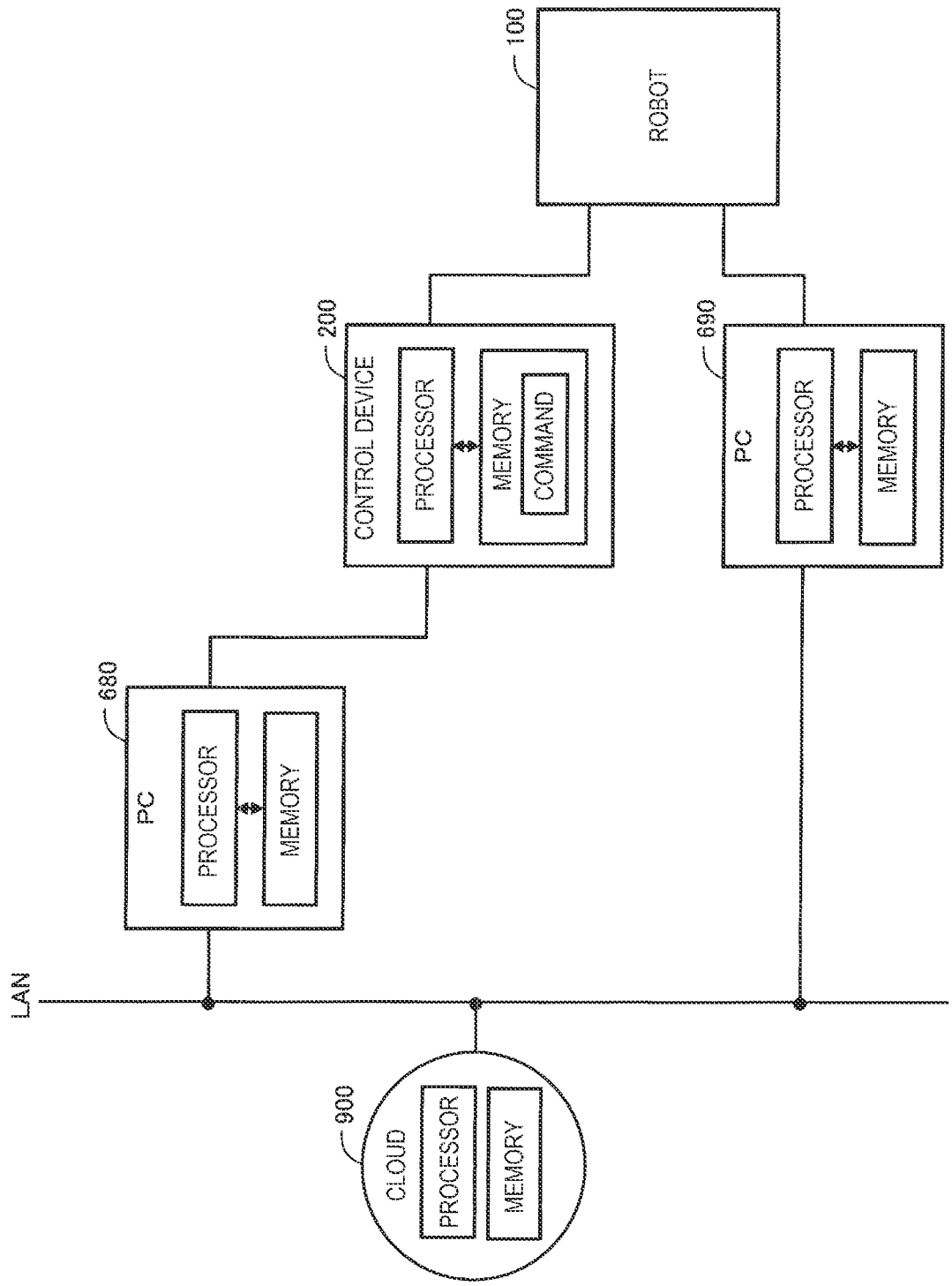
FIG. 17 is a conceptual diagram showing an example in which a control device of a robot is configured by a plurality of processors.

FIG. 17 is a conceptual diagram showing an example in which a control device for a robot is configured by a plurality of processors. In this example, besides the robot 100 and the robot control device 200 for the robot 100, personal computers 680 and 690 and a Cloud service 900 provided via a network environment such as a LAN are drawn. The personal computers 680 and 690 respectively include processors and memories. A processor and a memory can also be used in the Cloud service 900. It is possible to realize a control device and a setting device for the robot 100 using a part or all of these plurality of processors.

Figure 18:
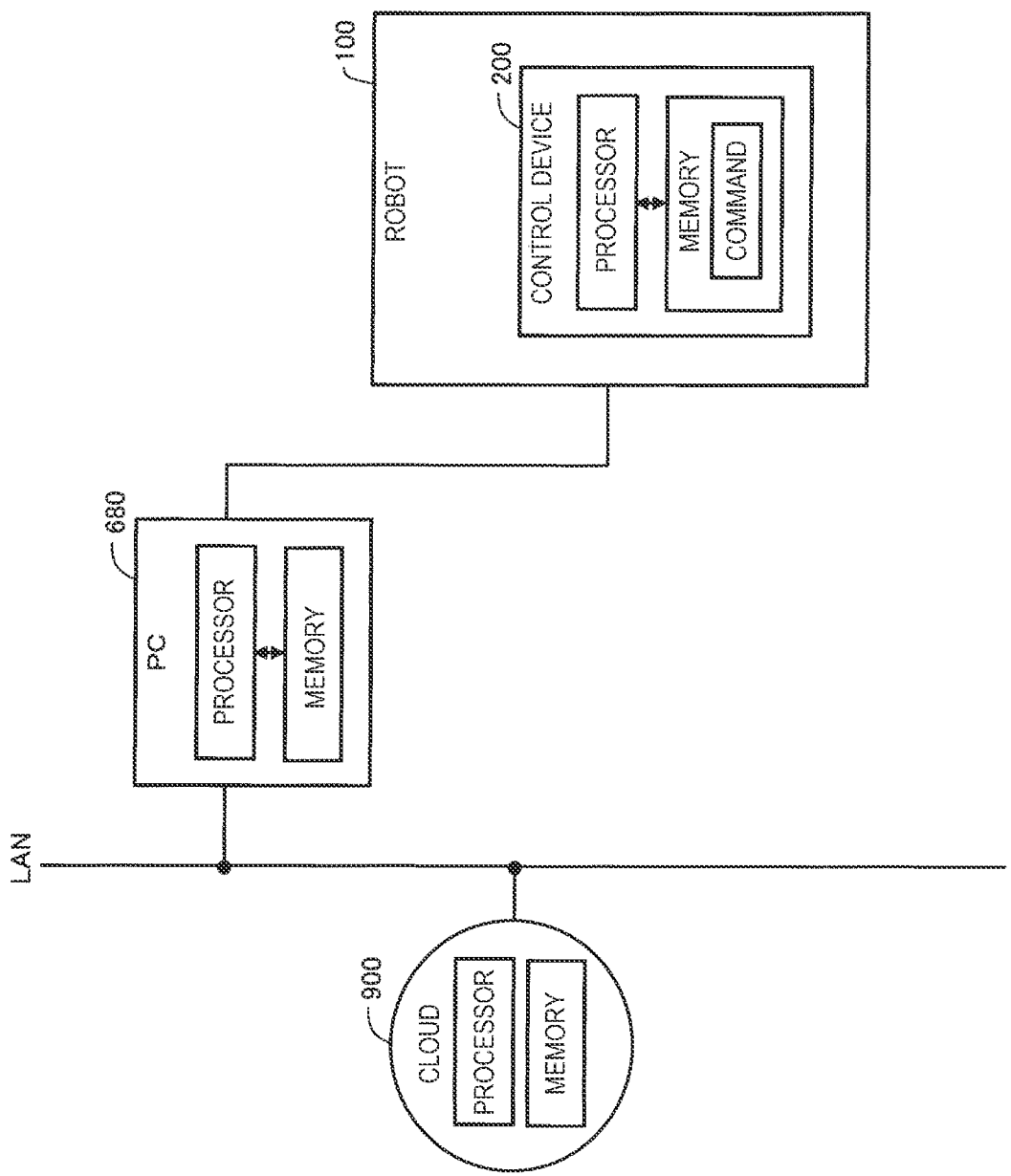
FIG. 18 is a conceptual diagram showing another example in which the robot control device of the robot is configured by a plurality of processors.

FIG. 18 is a conceptual diagram showing another example in which the control device of the robot is configured by a plurality of processors. The example shown in FIG. 18 is different from the example shown in FIG. 17 in that the robot control device 200 for the robot 100 is stored in the robot 100. In this example as well, it is possible to realize the control device and the setting device for the robot 100 using a part or all of the plurality of processors.

E. Other Embodiments

E1. Another Embodiment 1

(1) In the embodiment explained above, the end effector 140 can hold the workpiece WK1. However, as explained in the other application example 1, the end effector 140 may be able to hold the first target object via another component (see FIG. 15).

(2) In the embodiment explained above, the time-series change of the target force is explained (see FIGS. 13 and 14). Divisions of positions for realizing the time-series change of the target force may be independently decided about the x axis, the y axis, and the z axis or may be collectively decided about the x axis, the y axis, and the z axis.

(3) In the embodiment explained above, the time-series change of the target force is explained (see FIGS. 13 and 14). However, parameters other than the target force such as impedance parameters can also be set as values that change according to the position of the control point (see the upper right part of FIG. 6 and the lower part of FIG. 3). However, the parameters output by the algorithm may be constants.

(4) In the embodiment explained above, the optimization processing using the CMA-ES is performed in step S124 (see FIGS. 5 and 6). However, the optimization processing may be performed by another method such as PSO (Particle Swarm Optimization) or Bayesian optimization.

(5) In the embodiment explained above, the operation time OT is adopted as the evaluation value used for the determination in step S127 in FIG. 5 (see FIG. 7). However, the evaluation value used for determination of an end condition for the processing can be other evaluation values such as a detection force.

(6) In step S127 in the embodiment explained above, as the determination of the end condition for the processing, it is determined whether the evaluation value obtained in step S125 has converged. However, a condition that the evaluation value is a better value than a predetermined threshold can also be set as the end condition for the processing.

(7) Although not particularly referred to in the embodiment explained above, the setting device 600 may output the transition of the evaluation value corresponding to the repetition of the processing shown in, for example, FIG. 7 to the display device 660 as a graph. Similarly, the setting device 600 may output the transition of the output candidate values of the parameters corresponding to the repetition of the processing to the display device 660 as a graph.

(8) In the application example 2 explained above, the robot 100 does not move with respect to the NC machine tool 500. However, the robot 100 can also be configured as an autonomous mobile robot that can move together with a pedestal including the trays TR1 and TR2. With such a form, one robot can perform machine tending on the NC machine tool 500.

E2. Another Embodiment 2

In the embodiments explained above, the algorithm to which the force measurement value and the operation time are input and from which the candidate values of the force control parameters are output is used (see FIG. 6). However, the input to the algorithm can also be one of the force measurement value and the operation time. The input to the algorithm can also be other evaluation values such as a life and a maximum torque ratio. In such a form, optimization is performed about the input evaluation values, and candidate values of force control parameters that bring about a preferable result about the input evaluation values are determined.

(2) In the embodiment explained above, the algorithm to which the force measurement value and the operation time are input is used (see FIG. 6). However, three or more evaluation values may be input to the optimization algorithm. In a form in which a plurality of evaluation values are input to the optimization algorithm, by appropriately weighting the input evaluation values, it is possible to obtain preferable force control parameters with a smaller number of times of repetition (see S123 to S127 in FIG. 5).

In the form in which the plurality of evaluation values are input to the optimization algorithm, an objective function of the optimization processing can be appropriately decided using the plurality of evaluation values. The objective function can be one evaluation value such as the operation time OT. A weighted sum of three evaluation values including a maximum value of the detection force Fd, a maximum value of the detection torque Td, and the operation time OT or a hypervolume decided by the three evaluation values can also be set as the objective function. A weighted sum of three evaluation values including an integrated value of the detection force Fd and an integrated value of the detection torque Td in an optionally decided time in the following operation and the operation time OT or a hypervolume decided by the three evaluation values can also be set as the objective function.

The maximum value of the detection force Fd may be a maximum value of the detection force Fd serving as a combined force of components of the x axis, the y axis, and the z axis. The maximum value of the detection force Fd may be a maximum value of a detection force of each of the components of the x axis, the y axis, and the z axis. The maximum value of the detection torque Td may be a maximum value of the detection torque Td serving as combined torque of components around the x axis, the y axis, and the z axis. The maximum value of the detection torque Td may be a maximum value of detection torque of each of the components around the x axis, the y axis, and the z axis.

The integrated value of the detection force Fd may be an integrated value of the detection force Fd serving as a combined force of components of the x axis, the y axis, and the z axis. The integrated value of the detection force Fd may be an integrated value of a detection force of each of the components of the x axis, the y axis, and the z axis. The integrated value of the detection torque Td may be an integrated value of the detection torque Td serving as combined torque of components around the x axis, the y axis, and the z axis. The integrated value of the detection torque Td may be an integrated value of detection torque of each of the components around the x axis, the y axis, and the z axis.

On the other hand, in the form in which a plurality of evaluation values are input to the optimization algorithm, the optimization processing may be processing for performing multiobjective optimization. For example, multiobjective optimization for setting all of the maximum value of the detection force Fd, the maximum value of the detection torque Td, and the operation time OT as small as possible may be performed. Multiobjective optimization for setting all of the integrated value of the detection force Fd and the integrated value of the detection torque Td in the optionally decided time during the following operation and the operation time OT as small as possible may be performed.

E3. Another Embodiment 3

In the embodiment explained above, the optimization algorithm outputs the flag Flg for designating validity or invalidity of the force control, the position (xs, ys, zs) or (Rxs, Rys, Rzs) of the end effector 140 at the start time of the following operation, and the position (xp, yp, zp) or (Rxp, Ryp, Rzp) of the end effector 140 at the decided time between the start time and the end time of the following operation (see the lower right part of FIG. 6). However, one or more parameters among these parameters may not be included in the output. For example, the force control may be performed and the flag Flg for designating validity or invalidity of the force control may not be included in the output.

On the other hand, the optimization algorithm may output positions (xp, yp, zp) or (Rxp, Ryp, Rzp) of a plurality of sets of end effectors 140 corresponding to a plurality of passing points.

E4. Another Embodiment 4

The candidate values of the force control parameters output by the optimization algorithm include the virtual mass coefficient m, the virtual viscosity coefficient d, and the virtual modulus of elasticity k, which are the impedance parameters (see the upper right part of FIG. 6 and the lower part of FIG. 3). However, one or more of the virtual mass coefficient m, the virtual viscosity coefficient d, and the virtual modulus of elasticity k may be decided as fixed values in advance and the optimization algorithm may not output the other one or more coefficients.

F. Still Other Embodiments (1) According to an aspect of the present disclosure, there is provided an adjustment method for force control parameters used in force control of a robot system. The robot system includes a robot, a force detector provided in the robot and configured to measure an external force, and an end effector provided in the robot and configured to hold a first target object. The force control is performed based on a measurement value of the external force by the force detector when a following operation is executed using the robot. The following operation is an operation in which at least a part of the first target object held by the end effector is inserted into a void included in a second target object while coming into contact with the second target object or the part is pulled out from the void while coming into contact with the second target object. The adjustment method includes: a measuring step for causing the robot to perform the following operation using candidate values of the force control parameters including a target force in a direction orthogonal to a direction of the insertion or the pull-out and obtaining a force measurement value, which is a measurement value of the external force in the following operation; a parameter updating step for performing optimization processing about the force control parameters using the force measurement value and obtaining new candidate values of the force control parameters; and a parameter determining step for repeating the measuring step and the parameter updating step to thereby determine force control parameters used in the force control of the robot system and outputting the force control parameters.

With such a form, a value of the target force in the direction orthogonal to the direction of the insert or the pull-out is appropriately set. As a result, by performing the force control with the determined force control parameters, it is possible to cause the robot to appropriately insert the first target object into the void or pull out the first target object from the void.

(2) In the adjustment method according to the aspect, the measuring step may include measuring an operation time, which is a time required for the following operation, and the parameter updating step may be executed using an algorithm to which the force measurement value and the operation time are input and from which the candidate values of the force control parameters are output.

With such a form, in the parameter updating step, new candidate values of the force control parameters can be obtained by the optimization processing considering the force measurement value and the operation time. Therefore, by performing the force control with the determined force control parameters, it is possible to cause the robot system to appropriately insert the first target object into the void or pull out the first target object from the void in a movement with high evaluations about an external force received by the robot in the following operation and the operation time of the following operation.

(3) In the adjustment method according to the aspect, the algorithm may output designation of validity or invalidity of the force control, a position of the end effector at a start time of the following operation, and a position of the end effector at time between the start time and an end time of the following operation.

By performing the force control with the force control parameters determined by such a form, it is possible to perform control in which validity and invalidity of the force control, the position of the end effector at the start time of the following operation, and the position of the end effector at the time between the start time and the end time of the following operation are appropriately designated and cause the robot system to appropriately insert the first target object into the void or pull out the first target object from the void.

(4) In the adjustment method according to the aspect, the force control parameters may include a target force in the direction of the insertion or the pull-out, a virtual viscosity coefficient, a virtual modulus of elasticity, and a virtual mass coefficient in the force control.

With such a form, by performing the force control with the determined force control parameters, it is possible to perform appropriate force control and cause the robot system to appropriately insert the first target object into the void or pull out the first target object from the void.

(5) According to another aspect of the present disclosure, there is provided a control method for a robot system. The control method for the robot system includes performing force control when causing the robot system to execute a following operation. The robot system includes a robot, a force detector provided in the robot and configured to measure an external force, and an end effector provided in the robot and configured to hold a first target object. The following operation is an operation in which at least a part of the first target object held by the end effector is inserted into a void included in a second target object while coming into contact with the second target object or the part is pulled out from the void while coming into contact with the second target object. The force control is executed based on a measurement value of the external force by the force detector and according to a target force including a component in a direction orthogonal to a direction of the insertion or the pull-out, the component having non-zero magnitude.

With such a form, with the force control for also applying force in the direction orthogonal to the direction of the insertion or the pull-out, it is possible to cause the robot system to appropriately insert the first target object into the void or pull out the first target object from the void.

(6) According to another aspect of the present disclosure, there is provided a robot system. The robot system includes: a robot; a force detector provided in the robot and configured to measure an external force; an end effector provided in the robot and configured to hold a first target object; a control section configured to cause the robot to execute a following operation in which at least a part of the first target object held by the end effector is inserted into a void included in a second target object while coming into contact with the second target object or the part is pulled out from the void while coming into contact with the second target object, the control section performing, in the following operation, force control of the robot based on a measurement value of the external force by the force detector; and an adjusting section configured to perform adjustment of force control parameters used in the force control. The adjusting section performs measurement processing for causing the robot to perform the following operation using candidate values of the force control parameters including a target force in a direction orthogonal to a direction of the insertion or the pull-out and obtaining a force measurement value, which is a measurement value of the external force in the following operation; parameter update processing for performing optimization processing about the force control parameters using the force measurement value and obtaining new candidate values of the force control parameters; and parameter determination processing for repeating the measurement processing and the parameter update processing to thereby determine force control parameters used in the force control of the robot system and outputting the force control parameters.

With such a form, a value of the target force in the direction orthogonal to the direction of the insert or the pull-out is appropriately set. As a result, by performing the force control with the determined force control parameters, it is possible to cause the robot to appropriately insert the first target object into the void or pull out the first target object from the void.

(7) In the robot system according to the aspect, the measurement processing may include processing for measuring an operation time, which is a time required for the following operation, and the parameter update processing may be executed using an algorithm to which the force measurement value and the operation time are input and from which the candidate values of the force control parameters are output.

(8) In the robot system according to the aspect, the algorithm may output designation of validity or invalidity of the force control, a position of the end effector at a start time of the following operation, and a position of the end effector at time between the start time and an end time of the following operation.

(9) In the robot system according to the aspect, the force control parameters may include a target force in the direction of the insertion or the pull-out, a virtual viscosity coefficient, a virtual modulus of elasticity, and a virtual mass coefficient in the force control.

The present disclosure is not limited to the embodiment, the examples, and the modifications explained above and can be realized in various configurations without departing from the gist of the present disclosure. For example, technical features in the embodiment, the examples, and the modifications corresponding to technical features in the aspects described in the summary can be substituted or combined as appropriate in order to solve a part or all of the problems described above or achieve a part or all of the effects described above. Unless the technical features are explained as essential technical features in this specification, the technical features can be deleted as appropriate.

What is claimed is:

1. An adjustment method for force control parameters used in force control of a robot system,
    the robot system including a robot, a force detector provided in the robot and configured to measure an external force, and an end effector provided in the robot and configured to hold a first target object,
    the force control being performed based on a measurement value of the external force by the force detector when the robot is caused to execute a following operation,
    the following operation being an operation in which at least a part of the first target object held by the end effector is inserted into a void included in a second target object while coming into contact with the second target object or the part is pulled out from the void while coming into contact with the second target object,
    the adjustment method comprising:
    a measuring step for causing the robot to perform the following operation using candidate values of the force control parameters including a target force in a direction orthogonal to a direction of the insertion or the pull-out and obtaining a force measurement value, which is a measurement value of the external force in the following operation;

a parameter updating step for performing optimization processing about the force control parameters using the force measurement value and obtaining new candidate values of the force control parameters; and a parameter determining step for repeating the measuring step and the parameter updating step to thereby determine the force control parameters used in the force control of the robot system and outputting the force control parameters, wherein the measuring step includes measuring an operation time which is a time required for the following operation, and the parameter updating step is executed using an algorithm to which the force measurement value and the operation time are input and from which the candidate values of the force control parameters are output.

2. The adjustment method for the force control parameters according to claim 1, wherein the algorithm outputs designation of validity or invalidity of the force control, a position of the end effector at a start time of the following operation, and a position of the end effector at time between the start time and an end time of the following operation.

3. The adjustment method for the force control parameters according to claim 1, wherein the force control parameters include a target force in the direction of the insertion or the pull-out, a virtual viscosity coefficient, a virtual modulus of elasticity, and a virtual mass coefficient in the force control.

4. A robot system comprising:

a robot;

a force detector provided in the robot and configured to measure an external force;

an end effector provided in the robot and configured to hold a first target object;

a control section configured to cause the robot to execute a following operation in which at least a part of the first target object held by the end effector is inserted into a void included in a second target object while coming into contact with the second target object or the part is pulled out from the void while coming into contact with the second target object, the control section performing, in the following operation, force control of the robot based on a measurement value of the external force by the force detector; and a processor configured to execute a program stored in a memory so as to:

cause, as measurement processing, the robot to perform the following operation using candidate values of force control parameters including a target force in a direction orthogonal to a direction of the insertion or the pull-out to obtain a force measurement value, the force measurement value being a measurement value of the external force in the following operation, the force control parameters being used in the force control of the robot system;

perform, as parameter update processing, optimization processing about the force control parameters using the force measurement value to obtain new candidate values of the force control parameters; and repeat the measurement processing and the parameter update processing to thereby determine the force control parameters and output the force control parameters, wherein the processor is further configured to:

in the measurement processing, measure an operation time which is a time required for the following operation; and execute the parameter update processing using an algorithm to which the force measurement value and the operation time are input and from which the candidate values of the force control parameters are output.

5. The robot system according to claim 4, wherein the algorithm outputs designation of validity or invalidity of the force control, a position of the end effector at a start time of the following operation, and a position of the end effector at time between the start time and an end time of the following operation.

6. The robot system according to claim 4, wherein the force control parameters include a target force in the direction of the insertion or the pull-out, a virtual viscosity coefficient, a virtual modulus of elasticity, and a virtual mass coefficient in the force control.

* * * * *